United States Patent
Oi et al.

(10) Patent No.: US 8,971,066 B2
(45) Date of Patent: Mar. 3, 2015

(54) HARMONIC CURRENT SUPPRESSION METHOD AND HARMONIC CURRENT SUPPRESSION DEVICE OF POWER CONVERSION DEVICE

(75) Inventors: Kazunobu Oi, Numazu (JP); Yugo Tadano, Tokyo (JP)

(73) Assignee: Meidensha Corporation, Tokyo (JP)

( * ) Notice: Subject to any disclaimer, the term of this patent is extended or adjusted under 35 U.S.C. 154(b) by 201 days.

(21) Appl. No.: 13/814,288

(22) PCT Filed: Aug. 5, 2011

(86) PCT No.: PCT/JP2011/067944
§ 371 (c)(1),
(2), (4) Date: Feb. 5, 2013

(87) PCT Pub. No.: WO2012/018112
PCT Pub. Date: Feb. 9, 2012

(65) Prior Publication Data
US 2013/0135907 A1 May 30, 2013

(30) Foreign Application Priority Data

Aug. 6, 2010 (JP) .................................. 2010-177279
Nov. 11, 2010 (JP) .................................. 2010-252418

(51) Int. Cl.
*H02M 1/12* (2006.01)
*H02J 3/01* (2006.01)
*H02M 7/797* (2006.01)

(52) U.S. Cl.
CPC ................ *H02M 1/126* (2013.01); *H02J 3/01* (2013.01); *H02M 7/797* (2013.01); *Y02E 40/40* (2013.01)
USPC ................................ 363/39; 363/40; 323/207

(58) Field of Classification Search
USPC .............. 363/16, 17, 34–41, 95, 98; 323/211, 323/213, 255–258
See application file for complete search history.

(56) References Cited

U.S. PATENT DOCUMENTS

| | | | | |
|---|---|---|---|---|
| 4,560,917 A | * | 12/1985 | Gyugyi | 323/210 |
| 5,077,517 A | * | 12/1991 | Tanoue et al. | 323/207 |
| 7,145,310 B2 | * | 12/2006 | Ihm et al. | 318/717 |
| 7,456,621 B2 | * | 11/2008 | Leung et al. | 323/283 |
| 8,299,642 B2 | * | 10/2012 | Ichinose et al. | 290/44 |

FOREIGN PATENT DOCUMENTS

| | | |
|---|---|---|
| JP | 9-224332 A | 8/1997 |
| JP | 2000-253577 A | 9/2000 |
| JP | 2001-16867 A | 1/2001 |
| JP | 2009-106017 A | 5/2009 |
| JP | 2009-106131 A | 5/2009 |
| WO | WO 2010/024195 A1 | 3/2010 |

* cited by examiner

*Primary Examiner* — Rajnikant Patel
(74) *Attorney, Agent, or Firm* — Foley & Lardner LLP

(57) ABSTRACT

A current control unit takes a deviation between a current command value and a current flowing through an inverter of a power conversion device, and controls the inverter based on the deviation. A harmonic sensing part receives input of an output current of an AC filter, and outputs a predetermined order harmonic of the input current in a direct current value form. A disturbance observer estimates the disturbance of the harmonic based on the output current and a coefficient defined as an inverse function of a transfer function from harmonic suppression current command value to filter output current detection value. A harmonic suppression control unit takes the deviation between the estimated harmonic disturbance and a disturbance command value that suppresses the disturbance, and calculates a harmonic suppression current command value. The harmonic suppression current command value is superimposed on the current command value of the current control unit.

20 Claims, 11 Drawing Sheets

HARMONIC CURRENT SUPPRESSION METHOD AND HARMONIC CURRENT SUPPRESSION DEVICE OF POWER CONVERSION DEVICE

TECHNICAL FIELD

The present invention relates to harmonic current suppression for a power conversion device connected to a system, and relates to a harmonic current suppression device and a harmonic current suppression method capable of following a harmonic suppression control only with test operation wherein it is unnecessary to redesign control parameters irrespective of variation of a condition of the system.

BACKGROUND ART

When connected to a system, a power conversion device outputs harmonic currents in addition to a fundamental frequency current. The harmonic currents may cause overheating and breakdown of a power-factor-improving capacitor, burning of a transformer, beat of an electric motor, or malfunctioning of a breaker, wherein the power-factor-improving capacitor, the transformer, the electric motor, and the breaker are connected to the system. Accordingly, a regulation is provided for harmonic outflow when a power conversion device is connected to a system. In order to suppress harmonic current output, a power conversion device is connected to an LC filter.

However, it is possible that resonance between the LC filter and the capacitor, transformer or load in the system occurs to increase a specific order harmonic current output. For such a situation, there is a technique of adding a resistance to a filter capacitor in series, to suppress the harmonic current. Suppression of harmonic current may be implemented by applying damping control to the power conversion device, and applying a filter to an inverter output current sensing signal, to extract harmonics and adjust the phase, and adding same to an output voltage command value to cancel the harmonics (see patent document 1).

Moreover, in paragraphs 0005 and 0006 of the specification of patent document 2, it is described that an inverter control is performed with a feedback of a current of an output section of an LC filter in order to maintain a distortion current suppression effect even when the value of the inductance component of the system changes during resonance suppression control. Patent document 2 discloses a method of sensing the filter current and compensating for harmonics. In this control, a phase offset is added to inverse dq transformation that is used to extract a harmonic, for taking into account a transfer characteristic in phase from current command value to filter current.

Moreover, there is a method of measuring a transfer function from harmonic suppression current command value to output current of AC filter, for suppressing harmonic currents outputted from a power conversion device.

PRIOR ART DOCUMENT

Patent Document

Patent document 1: JP 2009-106131 A
Patent document 2: JP 2001-16867 A

SUMMARY OF THE INVENTION

Problem(s) to be Solved by the Invention

The method of adding a resistance to a filter capacitor in series is confronted by a problem that the harmonic suppression function of the filter is degraded and the resistance causes a loss.

Moreover, in the method disclosed in patent document 1, it is necessary to design control parameters of a damping control for each system to be connected. When variation of the system condition causes a variation in frequency of the harmonic current, it is impossible to conform to this situation, and it is necessary to redesign the parameters. If the system condition is known, design based on simulation is possible. However, it is difficult to investigate all of circuit constants in the system. Moreover, filter design is difficult, when harmonics have a plurality of frequencies.

The method disclosed in patent document 2 is confronted by a problem that the method does not take account of the transfer characteristic about amplitude. Accordingly, if the system condition varies, it is possible that when a harmonic current to be compensated is outputted from an inverter, a major part thereof flows into the filter capacitor, thus causing a problem that the inverter output current for compensating the distortion of the filter current becomes insufficient, so that the distortion remains or compensation for the distortion requires a long time period. Moreover, it is possible that the filter capacitor and the system cause resonance. In such a case, the filter current is greater than the inverter output current, so that the compensation for distortion may overshoot to make the control unstable. Moreover, when variation of the system condition causes a phase offset to deviate from a suitable value, wherein the phase offset is used for inverse dq transformation, a problem occurs where it takes much time to compensate the distortion, or the control becomes unstable.

The method of measuring the transfer function from harmonic suppression current command value to AC filter output current, requires complex calculation where the order of the transfer function is estimated by finding the number of resonance points during measurement of the transfer function, and then the coefficient for each order is estimated from the measurement result by the method of least square or the like.

In other control methods, design requires to investigate all circuit constants in the system. When the system condition changes, it becomes necessary to redesign parameters.

In the future, it is expected that use of natural energy is promoted so that more power conversion devices are connected, and the number of resonance points increases, and frequent change of the system condition occurs. Also for such a system, it is necessary to perform a harmonic suppression control capable of easily following the changing system condition without the necessity of redesign of control parameters. However, as described above, the conventional methods are confronted by the problem that the harmonic suppression control cannot follow the changing system condition without the necessity of redesign of control parameters.

The present invention is to solve the problems described above. It is an object of the present invention to provide a harmonic current suppression device and a harmonic current suppression method for a power conversion device which are capable of easily following the changing system condition without the necessity of redesign of control parameters.

Means for Solving the Problem(s)

In order to solve the problems described above, according to one feature, a harmonic current suppression device for a power conversion device, wherein an AC filter has one end connected to a system bus bar of an alternating current power supply and another end connected to the power conversion device, the harmonic current suppression device comprises: a current control means that acquires a deviation between a current flowing through the power conversion device and a current command value of power conversion device current, and controls the power conversion device based on an output of the deviation; and a harmonic suppression control means including: a harmonic sensing part that receives input of an output current of the AC filter, and outputs a predetermined order harmonic of the input current in a direct current value form; and a disturbance observer that estimates a disturbance of the harmonic by applying an output signal of the harmonic sensing part with a multiplier employing a coefficient, wherein the coefficient is defined as an inverse function of a transfer function from harmonic suppression current command value to current value inputted to the harmonic sensing part, wherein the coefficient is determined with measurement of a transfer characteristic of a control system; wherein the harmonic suppression control means calculates a harmonic suppression current command value by acquiring a deviation between the estimated disturbance and a disturbance command value for disturbance suppression; wherein the harmonic suppression current command value calculated by the harmonic suppression control means is superimposed on a current command value of the current control means, for harmonic current suppression.

According to another feature, a harmonic current suppression method for a power conversion device, wherein an AC filter has one end connected to a system bus bar of an alternating current power supply and another end connected to the power conversion device, the harmonic current suppression method comprises: a harmonic sensing step of causing a harmonic sensing part of a harmonic suppression control means to receive input of an output current of the AC filter, and output a predetermined order harmonic of the input current in a direct current value form; a disturbance estimation step of causing a disturbance observer of the harmonic suppression control means to estimate a disturbance of the harmonic by applying an output signal of the harmonic sensing part with a multiplier employing a coefficient, wherein the coefficient is defined as an inverse function of a transfer function from harmonic suppression current command value to current value inputted to the harmonic sensing part, wherein the coefficient is determined with measurement of a transfer characteristic of a control system; a harmonic suppression current command value calculation step of causing the harmonic suppression control means to calculate a harmonic suppression current command value by acquiring a deviation between the estimated disturbance and a disturbance command value for disturbance suppression; and a step of causing a current control means to acquire a deviation between a current flowing through the power conversion device and a current command value, and control the power conversion device based on an output of the deviation, wherein the current command value is produced by superimposing the harmonic suppression current command value calculated by the harmonic suppression control means on a set current command value.

According to the configuration described above, the feature that the harmonic suppression current command value is calculated by acquiring the deviation between the disturbance command value for disturbance suppression and the disturbance that is estimated based on the coefficient (the coefficient of the inverse function of the transfer function) for cancelling the transfer characteristic from the harmonic suppression current command value to the AC filter output current measured value, serves to suppress the harmonic current flowing out from the power conversion device due to resonance between the AC filter and the system impedance.

Moreover, also in cases where the AC filter and the system impedance are unknown and there are many resonance points, it is possible to perform a stable harmonic suppression based on measurement of coefficients Qam, Qbm by test operation, wherein it becomes unnecessary to design control parameters.

Moreover, although phase delay due to control delay has been conventionally caused a significant effect for a high order harmonic, the present invention in which the coefficient is determined based on measurement of the transfer characteristic including the control delay, makes it possible to suppress the harmonic stably even if the order of the harmonic is high.

According to another feature, the harmonic current suppression device is configured so that: the harmonic current suppression device is provided with a plurality of the harmonic suppression control means in parallel, wherein the plurality of harmonic suppression control means correspond to a plurality of orders of harmonics; the harmonic suppression current command values calculated by the harmonic suppression control means are summed; the sum of the current command values is superimposed on the current command value of the current control means.

According to another feature, the harmonic current suppression method is configured so that: the harmonic current suppression method is provided with a plurality of the harmonic suppression control means in parallel, wherein the plurality of harmonic suppression control means correspond to a plurality of orders of harmonics; and the harmonic current suppression method comprises a step of causing the current control means to sum the harmonic suppression current command values calculated by the harmonic suppression control means, and superimpose the sum of the current command values on the current command value of the current control means.

According to the configuration described above, the calculation of the harmonic sensing part of the harmonic suppression control section serves to completely cancel the interference with a different order harmonic, and thereby makes it possible to suppress a plurality of orders of harmonics.

According to another feature, the harmonic current suppression device is configured so that: the harmonic sensing part receives input of a summed current of the output current of the AC filter and a load current flowing through a load connected to the system bus bar, instead of input of the output current of the AC filter, and outputs a predetermined order harmonic of the input current in a direct current value form; and the coefficient of the disturbance observer is defined as an inverse function of a transfer function from the harmonic suppression current command value to the summed current.

According to another feature, the harmonic current suppression method is configured so that: the harmonic sensing step is a step of receiving input of a summed current of the output current of the AC filter and a load current flowing through a load connected to the system bus bar, instead of input of the output current of the AC filter, and outputting a predetermined order harmonic of the input current in a direct current value form; and the coefficient of the disturbance observer is defined as an inverse function of a transfer function from the harmonic suppression current command value to the summed current.

According to the configuration described above, it is possible to provide the active filtering function that absorbs at the power conversion device the harmonic current outputted by the system load, and prevent the harmonic current from being outputted to a high-level system.

According to another feature, the harmonic current suppression device is configured so that: the harmonic sensing part receives input of a system current flowing through the system bus bar, instead of input of the output current of the AC filter, and outputs a predetermined order harmonic of the input current in a direct current value form; and the coefficient of the disturbance observer is defined as an inverse function of a transfer function from the harmonic suppression current command value to the system current.

According to another feature, the harmonic current suppression method is configured so that: the harmonic sensing step is a step of receiving input of a system current flowing through the system bus bar, instead of input of the output current of the AC filter, and outputs a predetermined order harmonic of the input current in a direct current value form; and the coefficient of the disturbance observer is defined as an inverse function of a transfer function from the harmonic suppression current command value to the system current.

According to the configuration described above, it is possible to perform a stable harmonic suppression based on measurement of the coefficient by test operation, even in cases where the interconnection point of the system is connected to something other than the harmonic load or the active filter. Moreover, it is possible to omit the current sensor that senses the output current of the filter.

According to another feature, the harmonic current suppression device is configured so that the harmonic sensed by the harmonic sensing part in the direct current value form has an order n wherein n=−1 so that the harmonic suppression current command value calculated by the harmonic suppression control means is an opposite phase component of a fundamental.

According to another feature, the harmonic current suppression method is configured so that the harmonic sensed by the harmonic sensing step in the direct current value form has an order n wherein n=−1 so that the harmonic suppression current command value calculated by the harmonic suppression control means is an opposite phase component of a fundamental.

According to the configuration described above, it is possible to compensate an unbalanced component of the load current and balance the system current, in cases where the load is three-phase unbalanced.

According to another feature, the harmonic current suppression device is configured so that: the coefficient of the disturbance observer is determined with or without measurement of the transfer characteristic of the control system; the harmonic current suppression device includes: a coefficient correction amount calculation section that: evaluates an amount of change between a harmonic measured value of an output signal of the harmonic sensing part and a harmonic measured value one cycle before the output signal; calculates as a phase correction amount of the coefficient a difference in phase between the harmonic measured value one cycle before the output signal and the amount of change; and calculates as an amplitude correction amount of the coefficient a difference in amplitude between the harmonic measured value one cycle before the output signal and the amount of change; and a coefficient correction means that corrects the phase of the coefficient by the phase correction amount calculated by the coefficient correction amount calculation section, and corrects the amplitude of the coefficient by the amplitude correction amount calculated by the coefficient correction amount calculation section.

According to another feature, the harmonic current suppression method is configured so that: the coefficient of the disturbance observer is determined with or without measurement of the transfer characteristic of the control system; the harmonic current suppression method includes: a coefficient correction amount calculation step of causing a coefficient correction amount calculation section of a coefficient correction means to: evaluate an amount of change between a harmonic measured value of an output signal of the harmonic sensing part and a harmonic measured value one cycle before the output signal; calculate as a phase correction amount of the coefficient a difference in phase between the harmonic measured value one cycle before the output signal and the amount of change; and calculate as an amplitude correction amount of the coefficient a difference in amplitude between the harmonic measured value one cycle before the output signal and the amount of change; and a coefficient correction step of causing the coefficient correction means to correct the phase of the coefficient by the phase correction amount calculated by the coefficient correction amount calculation section, and correct the amplitude of the coefficient by the amplitude correction amount calculated by the coefficient correction amount calculation section.

According to the configuration described above, it is possible to perform a harmonic suppression following the change of the system condition while preventing the control from getting unstable due to change of the system condition such as load change. It is unnecessary to determine the coefficient by test operation, because it is possible to set the coefficient to a suitable value even if the initial value of the coefficient is not determined carefully.

According to another feature, the harmonic current suppression device is configured so that the coefficient correction means presets a condition for correction, and adjusts the calculated phase correction amount and amplitude correction amount, depending on whether or not the sensed harmonic conforms to the condition for correction.

According to another feature, the harmonic current suppression method is configured so that the coefficient correction step presets a condition for correction, and adjusts the calculated phase correction amount and amplitude correction amount, depending on whether or not the sensed harmonic conforms to the condition for correction.

According to the configuration described above, it is possible to adjust the correction amount depending on the object, by setting the condition for correction depending on the object that is, for example, to suppress the occurrence of overshooting, or to enhance the accuracy of amplitude.

According to another feature, the harmonic current suppression device is configured so that: the current control means acquires a deviation between a d-axis component of the current flowing through the power conversion device and a current command value of d-axis component of power conversion device current and a deviation between a q-axis component of the current flowing through the power conversion device and a current command value of q-axis component of power conversion device current, and controls the power conversion device based on an output of the deviations; and the harmonic sensing part of the harmonic suppression control means includes: a discrete Fourier transformation part that applies d, q-axis transformation to the input current, and outputs a predetermined order harmonic of the input current in a direct current value form; and a disturbance observer that estimates a disturbance of a d-axis component of the harmonic and a disturbance of a q-axis component of the harmonic by applying an output signal of the discrete Fourier transformation part with a multiplier employing a coefficient, wherein the coefficient is defined as an inverse function of a transfer function from harmonic suppression current command value of each of d-axis and q-axis components to current value inputted to the harmonic sensing part, wherein the coefficient is determined with measurement of the transfer characteristic of the control system; wherein d-axis and q-axis harmonic suppression current command values are calculated by acquiring a deviation between the estimated disturbance and a disturbance command value for disturbance suppression; wherein the d-axis and q-axis harmonic suppression current command values calculated by the harmonic suppression control means is superimposed on d-axis and q-axis current command values of the current control means, for harmonic current suppression.

According to another feature, the harmonic current suppression method is configured so that: the harmonic sensing step is a step of causing a discrete Fourier transformation part to apply d, q-axis transformation to the input current, and output a predetermined order harmonic of the input current in a direct current value form; the disturbance estimation step is a step of estimating a disturbance of a d-axis component of the harmonic and a disturbance of a q-axis component of the harmonic by applying an output signal of the discrete Fourier transformation part with a multiplier employing a coefficient, wherein the coefficient is defined as an inverse function of a transfer function from harmonic suppression current command value of each of d-axis and q-axis components to current value inputted to the harmonic sensing part, wherein the coefficient is determined with measurement of the transfer characteristic of the control system; the harmonic suppression current command value calculation step is a step of calculating d-axis and q-axis harmonic suppression current command values by acquiring a deviation between the estimated disturbance and a disturbance command value for disturbance suppression; and the step of controlling the power conversion device is a step of acquiring a deviation between a d-axis component of the current flowing through the power conversion device and a current command value obtained by superimposing the d-axis harmonic suppression current command value calculated by the harmonic suppression control means on a d-axis current command value of the current control means, and acquiring a deviation between a q-axis component of the current flowing through the power conversion device and a current command value obtained by superimposing the q-axis harmonic suppression current command value calculated by the harmonic suppression control means on a q-axis current command value of the current control means, and controlling the power conversion device based on an output of the deviations.

According to the configuration described above, the feature that the harmonic suppression current command value is calculated by acquiring the deviation between the disturbance command value for disturbance suppression and the disturbance that is estimated based on the coefficient (the coefficient of the inverse function of the transfer function) for cancelling the transfer characteristic from the d-axis and q-axis harmonic suppression current command values to the AC filter output current measured values, serves to suppress the harmonic current flowing out from the three-phase power conversion device due to resonance between the AC filter and the system impedance.

Moreover, also in cases where the AC filter and the system impedance are unknown and there are many resonance points, it is possible to perform a stable harmonic suppression based on measurement of coefficients Qam, Qbm by test operation, wherein it becomes unnecessary to design control parameters.

Moreover, although phase delay due to control delay has been conventionally caused a significant effect for a high order harmonic, the present invention in which the coefficient is determined based on measurement of the transfer characteristic including the control delay, makes it possible to suppress the harmonic stably even if the order of the harmonic is high.

According to another feature, the harmonic current suppression device is configured so that: the disturbance observer estimates the disturbances by calculating $(Ioutd \cdot Qam - Ioutq \cdot Qbm) + j(Ioutq \cdot Qam + Ioutd \cdot Qbm)$ by applying a multiplier to a n-th order harmonic measured value of a d-axis output signal of the discrete Fourier transformation section represented by Ioutd and a n-th order harmonic measured value of a q-axis output signal of the discrete Fourier transformation section represented by Ioutq, wherein the multiplier employs the coefficient, wherein n is an integer other than zero, wherein the coefficient is defined as an inverse characteristic $Qam + j \cdot Qbm$ of a transfer characteristic $Pam + j \cdot Pbm$ from current command value to AC filter output current measured value; the transfer characteristic of the control system is expressed in a complex number form wherein the d-axis component of the output current of the discrete Fourier transformation section is defined as a real part, and the q-axis component of the output current of the discrete Fourier transformation section is defined as an imaginary part; and Pam represents an output current of the discrete Fourier transformation section that is in phase with harmonic suppression current command values of d-axis and q-axis components, and Pbm represents an output current of the discrete Fourier transformation section that is advanced by 90 degrees in phase from the harmonic suppression current command values of d-axis and q-axis components.

According to another feature, the harmonic current suppression method is configured so that: the disturbance estimation step is a step of estimating the disturbances by calculating $(Ioutd \cdot Qam - Ioutq \cdot Qbm) + j(Ioutq \cdot Qam + Ioutd \cdot Qbm)$ by applying a multiplier to a n-th order harmonic measured value of a d-axis output signal of the discrete Fourier transformation section represented by Ioutd and a n-th order harmonic measured value of a q-axis output signal of the discrete Fourier transformation section represented by Ioutq, wherein the multiplier employs the coefficient, wherein n is an integer other than zero, wherein the coefficient is defined as an inverse characteristic $Qam + j \cdot Qbm$ of a transfer characteristic $Pam + j \cdot Pbm$ from current command value to AC filter output current measured value; the transfer characteristic of the control system is expressed in a complex number form wherein the d-axis component of the output current of the discrete Fourier transformation section is defined as a real part, and the q-axis component of the output current of the discrete Fourier transformation section is defined as an imaginary part; and Pam represents an output current of the discrete Fourier transformation section that is in phase with harmonic suppression current command values of d-axis and q-axis components, and Pbm represents an output current of the discrete Fourier transformation section that is advanced by 90 degrees in phase from the harmonic suppression current command values of d-axis and q-axis components.

According to another feature, the harmonic current suppression device is configured so that: the current control means obtains a single-phase voltage command value by addition of a reference sine wave to the output of deviation between the current flowing through the power conversion device and the current command value, and controls the power conversion device based on the single-phase voltage command value, wherein the reference sine wave is in phase with a voltage of an interconnection point between the system bus bar and the AC filter; the harmonic sensing part of the harmonic suppression control means obtains a first product of the input current and a sine wave signal that is identical in frequency to a harmonic for which suppression is targeted and identical in phase to n times the phase of the voltage of the interconnection point between system bus bar and the AC filter, wherein n represents the order of the harmonic for which suppression is targeted, and extracts a direct current component of the first product, and obtains a harmonic measured signal in phase with the n-th order harmonic; the harmonic sensing part of the harmonic suppression control means obtains a second product of the input current and a cosine wave signal that is identical in frequency to the harmonic for which suppression is targeted and identical in phase to n times the phase of the voltage of the interconnection point between system bus bar and the AC filter, wherein n represents the order of the harmonic for which suppression is targeted, and extracts a direct current component of the second product, and obtains a harmonic measured signal advanced by 90 degrees in phase from the n-th order harmonic; and the disturbance observer of the harmonic suppression control means estimates the disturbance of the harmonic by applying the output signal of the harmonic sensing part with a multiplier employing a coefficient, wherein the coefficient is defined as an inverse function of a transfer function from a harmonic suppression current command value of a component in phase to the n-th order harmonic and a harmonic suppression current command value of a component advanced by 90 degrees in phase from the n-th order harmonic to a current value inputted to the harmonic sensing part, wherein the coefficient is determined with measurement of the transfer characteristic of the control system.

According to another feature, the harmonic current suppression method is configured so that: the step of controlling the power conversion device is a step of obtaining a single-phase voltage command value by addition of a reference sine wave to the output of deviation between the current flowing through the power conversion device and the current command value, and controlling the power conversion device based on the single-phase voltage command value, wherein the reference sine wave is in phase with a voltage of an interconnection point between the system bus bar and the AC filter; the harmonic sensing step includes a step of obtaining a first product of the input current and a sine wave signal that is identical in frequency to a harmonic for which suppression is targeted and identical in phase to n times the phase of the voltage of the interconnection point between system bus bar and the AC filter, wherein n represents the order of the harmonic for which suppression is targeted, and extracting a direct current component of the first product, and obtaining a harmonic measured signal in phase with the n-th order harmonic; and a step of obtaining a second product of the input current and a cosine wave signal that is identical in frequency to the harmonic for which suppression is targeted and identical in phase to n times the phase of the voltage of the interconnection point between system bus bar and the AC filter, wherein n represents the order of the harmonic for which suppression is targeted, and extracting a direct current component of the second product, and obtaining a harmonic measured signal advanced by 90 degrees in phase from the n-th order harmonic; and the disturbance estimation step is a step of estimating the disturbance of the harmonic by applying the output signal of the harmonic sensing part with a multiplier employing a coefficient, wherein the coefficient is defined as an inverse function of a transfer function from a harmonic suppression current command value of a component in phase to the n-th order harmonic and a harmonic suppression current command value of a component advanced by 90 degrees in phase from the n-th order harmonic to a current value inputted to the harmonic sensing part, wherein the coefficient is determined with measurement of the transfer characteristic of the control system.

According to the configuration described above, the feature that the harmonic suppression current command value is calculated by acquiring the deviation between the disturbance command value for disturbance suppression and the disturbance that is estimated based on the coefficient (the coefficient of the inverse function of the transfer function) for cancelling the transfer characteristic from the harmonic suppression current command value to the AC filter output current measured value, serves to suppress the harmonic current flowing out from the single-phase power conversion device due to resonance between the AC filter and the system impedance.

Moreover, also in cases where the AC filter and the system impedance are unknown and there are many resonance points, it is possible to perform a stable harmonic suppression based on measurement of coefficients Qam, Qbm by test operation, wherein it becomes unnecessary to design control parameters.

Moreover, although phase delay due to control delay has been conventionally caused a significant effect for a high order harmonic, the present invention in which the coefficient is determined based on measurement of the transfer characteristic including the control delay, makes it possible to suppress the harmonic stably even if the order of the harmonic is high.

Effect(s) of the Invention (1) According to another feature, it is possible to suppress the harmonic current flowing out from the power conversion device due to resonance between the AC filter and the system impedance.

Moreover, also in cases where the AC filter and the system impedance are unknown and there are many resonance points, it is possible to perform a stable harmonic suppression based on measurement of coefficients by test operation, wherein it becomes unnecessary to design control parameters.

If variation occurring in the system condition is small, it is possible to continue the stable harmonic suppression where it is unnecessary to change the coefficient. Even when a significant variation occurs in the system condition, it is possible to conform to the variation only by measuring the coefficient again by test operation.

(2) According to another feature, it is possible to automatically correct the coefficient that is the inverse function of the transfer characteristic from the harmonic suppression current command value to the AC filter output current measured value.

It is possible to perform a harmonic suppression following the change of the system condition while preventing the control from getting unstable due to change of the system condition such as load change. It is unnecessary to determine the coefficient by test operation, because it is possible to set the coefficient to a suitable value even if the initial value of the coefficient is not determined carefully.

(3) According to another feature, it is possible to suppress harmonic currents even when the harmonic current flowing out from the power conversion device has a plurality of orders.

(4) According to another feature, it is possible to provide the active filtering function that absorbs at the power conversion device the harmonic current outputted by the system load, and prevents the harmonic current from being outputted to a high-level system.

Also in cases where the AC filter, the system impedance, the characteristic of the harmonic load are unknown and there are many resonance points, it is possible to perform a stable active filtering operation based on measurement of coefficients by test operation. Moreover, even when a significant variation occurs in the system condition, it is possible to conform to the variation only by measuring the coefficient again by test operation.

Moreover, it is possible to conform the AC filter output current and the load current harmonic to each other, and thereby obtain high performance of harmonic current compensation.

(5) According to another feature, it is possible to perform a stable harmonic suppression based on measurement of the coefficient by test operation, even in cases where the interconnection point of the system is connected to something other than the harmonic load or the active filter. Moreover, it is possible to omit the current sensor that senses the output current of the filter.

(6) According to another feature, it is possible to achieve an unbalanced current compensation function. Moreover, combination with other features makes it possible to add the unbalanced current compensation function to the harmonic current suppression based on active filtering.

(7) According to another feature, it is possible to adjust the correction amount depending on the object, by setting the condition for correction depending on the object that is, for example, to suppress the occurrence of overshooting, or to enhance the accuracy of amplitude.

(8) According to another feature, the transfer function from the harmonic suppression current command value to the AC filter output current measured value is expressed in complex number form. This makes it possible to identify the transfer characteristic by the amplitude change and the phase change, and estimate the disturbance only by simple calculation of (Ioutd·Qam−Ioutq·Qbm)+j(Ioutq·Qam+Ioutd·Qbm) by using the complex number form.

(9) According to another feature, it is possible to suppress the harmonic current flowing out from the single-phase power conversion device due to resonance between the AC filter and the system impedance, and thereby obtain similar effects as in (1) described above.

BRIEF DESCRIPTION OF THE DRAWINGS

FIG. 1 shows configuration of a power conversion device according to a first embodiment of the present invention, wherein

FIG. 16 shows configuration of a power conversion device according to an eighth embodiment of the present invention, wherein

MODE(S) FOR CARRYING OUT THE INVENTION

The following describes modes for carrying out the present invention with reference to the drawings. The present invention is not limited to embodiments described below. The first to seventh embodiments are explained with reference to an example where a three-phase inverter is employed as a power conversion device, whereas the eighth and ninth embodiments are explained with reference to an example where a single-phase inverter is employed as a power conversion device.

Embodiment 1

Figure 1A:
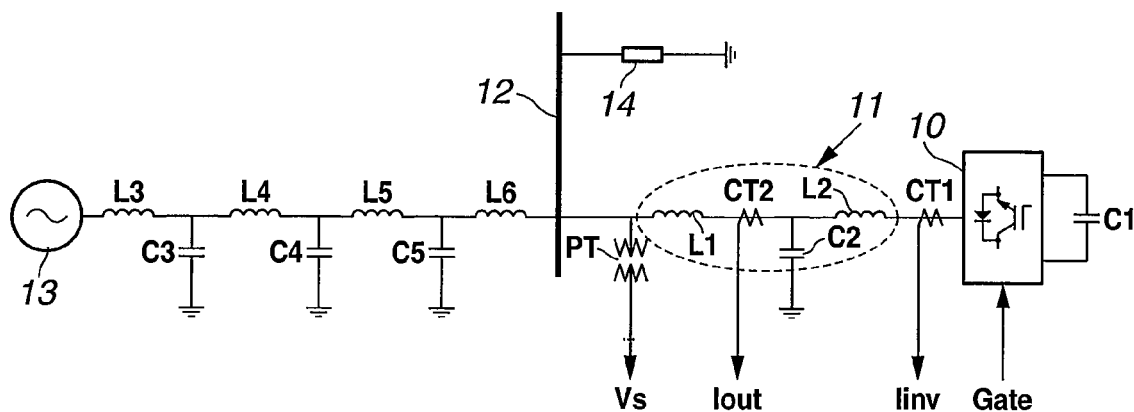
FIG. 1A is a block diagram of a main circuit.
Figure 1B:
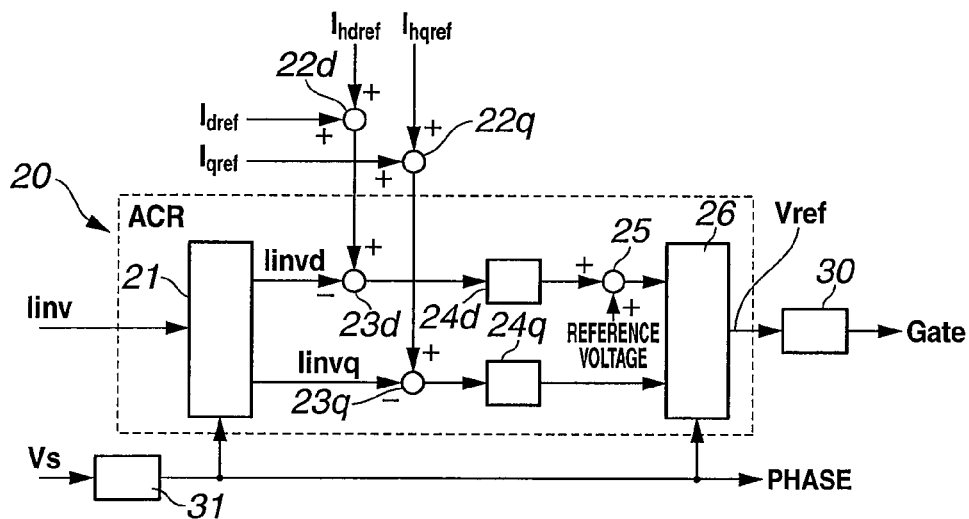
FIG. 1B is a block diagram of a current control section.
Figure 1C:
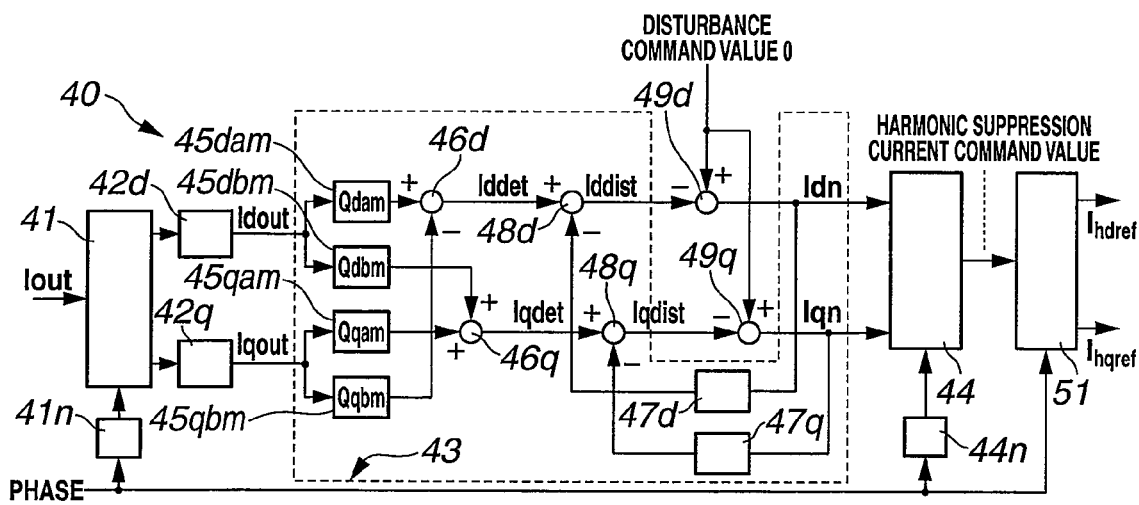
FIG. 1C is a block diagram of a harmonic suppression control section.

FIG. 1 shows configuration of a power conversion device 10 according to a first embodiment of the present invention, wherein FIG. 1A shows a main circuit of power conversion device 10, FIG. 1B shows a current control section for controlling the power conversion device 10, and FIG. 1C shows a harmonic suppression control section for controlling the power conversion device 10.

In FIG. 1A, power conversion device 10 includes an inverter in which an antiparallel unit of a semiconductor switching element and a diode is three-phase-bridge-connected. The direct current side of the inverter is connected to a capacitor C1. The electric energy stored in capacitor C1 is converted into an alternating current by power conversion device 10 and then supplied to a system. The alternating current side of power conversion device 10 is connected to a system bus bar 12 through an LCL filter (AC filter) 11 that is composed of reactors L1, L2 and a capacitor C2. Many devices such as reactors L3-L6 and capacitors C3-C5 are disposed between system bus bar 12 and alternating current power supply 13 for simulating a filter reactor for harmonic suppression, a leakage reactance of a transformer, a parasitic impedance and stray capacity of a cable, and a force factor improving capacitor, and thereby providing many resonance points.

A load 14 is connected to system bus bar 12. A current sensor CT1 senses an inverter current Iinv. A current sensor CT2 senses an output current of LCL filter 11. A transformer PT senses a voltage of an interconnection point connected to the system.

In FIG. 1B which shows configuration of current control section 20, a dq transformation part 21 receives input of inverter current Iinv sensed by current sensor CT1 in FIG. 1A, and transforms the inverter current Iinv into the d-axis and q-axis.

An adder 22$d$ obtains a sum signal Idref+Ihdref of a d-axis output current command value Idref and a d-axis harmonic suppression current command value Ihdref. An adder 22$q$ obtains a sum signal Iqref+Ihdref of a q-axis output current command value Iqref and a q-axis harmonic suppression current command value Ihdref.

A d-axis current command adder 23$d$ receives input of the sum signal Idref+Ihdref and a d-axis inverter current Iinvd outputted by dq transformation part 21, and obtains a deviation signal.

A q-axis current command adder 23$q$ receives input of the sum signal Iqref+Ihqref and a q-axis inverter current Iinvq outputted by dq transformation part 21, and obtains a deviation signal.

A d-axis proportional-integral controller 24$d$ receives input of the d-axis deviation signal. A q-axis proportional-integral controller 24$q$ receives input of the q-axis deviation signal. A d-axis voltage command adder 25 sums the output signal from the d-axis proportional-integral controller 24$d$ and a reference voltage described below.

An inverse dq transformation part 26 receives input of a d-axis voltage command value Vdref outputted from d-axis voltage command adder 25 and a q-axis voltage command value Vqref outputted from q-axis proportional-integral controller 24$q$, and obtains a three-phase voltage command value Vref.

A PWM gate signal generator 30 is provided on the output side of current control section 20, and PWM-modulates the three-phase voltage command value Vref with a carrier signal, thus obtaining a gate signal of power conversion device 10.

A PLL (phase locked loop) controller 31 receives input of an interconnection point voltage Vs sensed by transformer PT in FIG. 1A, and outputs the phase to dq transformation part 21 and inverse dq transformation part 26.

In FIG. 1C which shows configuration of a harmonic suppression control section 40, a dq transformation part 41 receives input of a filter output current Iout sensed by current sensor CT2 in FIG. 1A, and transforms the filter output current Iout into the d-axis and q-axis.

A d-axis LPF 42$d$ receives input of a signal outputted by dq transformation part 41, and outputs a filter output current Idout. A q-axis LPF 42$q$ receives input of a signal outputted by dq transformation part 41, and outputs a filter output current Iqout.

In the first embodiment, the dq transformation part 41, d-axis LPF 42$d$, and q-axis LPF 42$q$ constitute a discrete Fourier transformation section of the present invention.

A disturbance observer 43 receives input of the filter output currents Idout, Iqout, and estimates a disturbance in harmonic, and outputs a d-axis harmonic suppression signal Idn and a q-axis harmonic suppression current command value Iqn.

An inverse dq transformation part 44 receives input of d-axis harmonic suppression signal Idn and q-axis harmonic suppression current command value Iqn outputted from disturbance observer 43, and performs inverse dq transformation.

A harmonic suppression current command outputted from inverse dq transformation part 44 is applied with dq transformation by a dq transformation part 51, and thereafter added to d-axis output current command value Idref and q-axis output current command value Iqref respectively.

The dq transformation part 41 and inverse dq transformation part 44 also receive input of the phase signal. Specifically, the phase outputted from PLL controller 31 in FIG. 1B is inputted to dq transformation part 41 and inverse dq transformation part 44 through a multiplier 41$n$ and a multiplier 44$n$ each of which multiplies the phase by n wherein n represents the order of a harmonic that is a target of suppression. The dq transformation part 51 at the final stage receives direct input of the phase signal without passing through a multiplier. This is because transformation to a dq coordinate system is conformed to PI calculation on a fundamental wave dq coordinate system in the current control section in FIG. 1B.

The following describes disturbance observer 43 in detail. Disturbance observer 43 is composed of multipliers 45$dam$, 45$dbm$, multipliers 45$qam$, 45$qbm$, a d-axis harmonic suppression current command adder 46$d$, a q-axis harmonic suppression current command adder 46$q$, a d-axis LPF 47$d$, a q-axis LPF 47$q$, an adder 48$d$, an adder 48$q$, an adder 49$d$, and an adder 49$q$. Multipliers 45$dam$, 45$dbm$ and multipliers 45$qam$, 45$qbm$ receive input of filter output currents Idout, Iqout, wherein multipliers 45$dam$, 45$dbm$ have d-axis coefficients Qdam, Qdbm, and multipliers 45$qam$, 45$qbm$ have q-axis coefficients Qqam, Qqbm. The d-axis harmonic suppression current command adder 46$d$ obtains a subtraction signal Iddet of d-axis coefficient Qdam and q-axis coefficient Qqbm, whereas q-axis harmonic suppression current command adder 46$q$ obtains an addition signal Iqdet of q-axis coefficients Qqam and d-axis coefficient Qdbm. The d-axis LPF 47$d$ and q-axis LPF 47$q$ receive input of d-axis harmonic suppression signal Idn and q-axis harmonic suppression current command value Iqn respectively. The adder 48$d$ calculates a deviation between the output of d-axis LPF 47$d$ and Iddet, whereas adder 48$q$ calculates a deviation between the output of q-axis LPF 47$q$ and Iqdet. The adder 49$d$ calculates a deviation between the subtraction signal Iddist and a disturbance command value, whereas adder 49$q$ calculates a deviation between the subtraction signal Iqdist and the disturbance command value.

Disturbance observer 43 outputs d-axis harmonic suppression signal Idn and q-axis harmonic suppression current command value Iqn. These signals are also inputted into LPFs 47*d*, 47*q*, and used inside the disturbance observer.

The coefficients Qdam, Qdbm, Qqam, Qqbm are an inverse function of a transfer characteristic from harmonic suppression command value to AC filter output current measured value, with setting of Qdam=Qqam, Qdbm=Qqbm.

The following describes operation of the device configured as described above. In the current control section shown in FIG. 1B, inverter current Iinv sensed by current sensor CT1 is transformed by dq transformation part 21 to values on a rotating coordinate system. The transformed d-axis inverter current Iinvd and q-axis inverter current Iinvq are compared with current command values at current command adders 23*d*, 23*q*.

The current command values are generated by adding at adders 22*d*, 22*q* the current command values Ihdref, Ihqref for harmonic suppression described below to output current command values Idref, Iqref depending on the object of the device.

For example, current command values Ihdref, Ihqref are set for a control of holding constant the voltage of a direct current capacitor, or for a reactive power compensation of supplying a reactive power to a system. It is conceivable that the direct current capacitor is replaced with a battery so that active power is supplied to the system.

The d-axis inverter current Iinvd and q-axis inverter current Iinvq are compared with the current command values outputted from adders 22*d*, 22*q*, to obtain deviations, and apply the deviations with proportional-integral controller 24*d*, 24*q*, thus calculating the voltage command values Vdref, Vqref.

Addition of the reference voltage after d-axis proportional-integral controller 24*d* (addition at adder 25) means addition of a rated amplitude value of the system voltage. This and the following dq transformation is equivalent to addition of a fundamental sine wave synchronized with the phase of interconnection point voltage Vs. The phase used in dq transformation is calculated by PLL controller 31 which receives input of interconnection point voltage Vs. Finally, the three-phase voltage command value Vref outputted by dq transformation part 26 is PWM-modulated by PWM gate signal generator 30, to generate a gate signal Gate, and thereby drive the inverter.

In harmonic suppression control section 40 shown in FIG. 1C, filter output current Iout, which is sensed by current sensor CT2 and is a target whose harmonic current is to be suppressed, is inputted into dq transformation part 41.

Then, in the case where the order of the harmonic current to be suppressed is n, the frequency of the phase signal calculated by PLL controller 31 in FIG. 1B is multiplied by n by multiplier 41*n*, and transformed by dq transformation part 41, thus converting the nth-order harmonic current into a direct current signal. The dq transformation is set with reference to the U-phase current as d-axis in this example.

n is an integer, and n is set to −5, 7, −11, 13, . . . , because a typical three-phase alternating current circuit that is composed only by a balanced load with no neutral conductor has the following characteristics:

no even-numbered order harmonic flows,
no harmonic of the order of multiples of 3 flows in a three-phase three-wire circuit,
of harmonics of the order 6m−1 (m is an integer), only opposite-phase components flow, if the load is balanced,
of harmonics of the order 6m+1, only in-phase components flow, if the load is balanced.

These characteristics can be explained with reference to the following equation.

Namely, where n=3m for harmonic currents of the order of multiples of 3 (m in an integer), $$I_d = \frac{2}{3}\left[I_a \sin(3m\omega t) + I_b \sin\left(3m\omega t - \frac{6m\pi}{3}\right) + I_c \sin\left(3m\omega t + \frac{6m\pi}{3}\right)\right] \quad (1)$$

$$= \frac{2}{3}[I_a \sin(3m\omega t) + I_b \sin(3m\omega t) + I_c \sin(3m\omega t)]$$

Accordingly, no current flows because all of the three phases are in phase with each other. Where n=6m−1 for harmonic currents of the order of 6m−1 (n is an integer), $$I_d = \frac{2}{3}\left[\begin{array}{l}I_a \sin((6m-1)\omega t) + I_b \sin\left((6m-1)\omega t - \frac{12m\pi - 2\pi}{3}\right) + \\ I_c \sin\left((6m-1)\omega t + \frac{12m\pi - 2\pi}{3}\right)\end{array}\right] \quad (2)$$

$$= \frac{2}{3}\left[\begin{array}{l}I_a \sin((6m-1)\omega t) + I_b \sin\left((6m-1)\omega t + \frac{2\pi}{3}\right) + \\ I_c \sin\left((6m-1)\omega t - \frac{2\pi}{3}\right)\end{array}\right]$$

Accordingly, about Ib and Ic, the sign of 2π/3 is opposite. This means Ib and Ic have opposite phases.

Then, the output current of dq transformation part 41 is applied with d-axis LPF 42*d* and q-axis LPF 42*q*, to obtain d-axis filter output current Idout and q-axis filter output current Iqout. Each output signal of dq transformation part 41 contains harmonics of orders that are different from a fundamental wave frequency signal or a specific order to be extracted, which harmonics are superimposed as an alternating current signal. This alternating current signal is removed, to extract a direct current component only. The used LPF may be implemented by another moving average having the first order delay or the second order delay. Alternatively, average processing may be used for reducing the used memory.

In the following explanation and FIG. 2 and the following figures, d-axis coefficient Qdam or q-axis coefficient Qqam is treated as coefficient Qam, whereas d-axis coefficient Qdbm or q-axis coefficient Qqbm is treated as coefficient Qbm.

Next, at multipliers 45*dam*, 45*dbm*, 45*qam*, 45*qbm*, multiplication by coefficient Qam and coefficient Qbm is calculated. The coefficients Qam, Qbm are an inverse function of a transfer characteristic from harmonic suppression current command value Ihdref, Ihqref to a measured value of AC filter output current Iout, and is set to a predetermined value. This serves to cancel a transfer characteristic which is a phase delay or the like.

Finally, disturbance estimation is performed. The disturbance is calculated by acquiring a deviation between the following two signals.

(1) Harmonic suppression currents Idn, Iqn which have passed through an actual system, and have been multiplied by coefficients Qam, Qbm, to cancel the transfer characteristic of the actual system.
(2) Harmonic suppression currents Idn, Iqn which have not passed through the actual system, and have passed only through the sensing LPFs 47*d*, 47*q*.

The above (1) is a signal on which a disturbance in the actual system is superimposed, whereas the above (2) is a signal containing no disturbance, wherein the command value (disturbance command value 0) is only applied with LPFs 47*d*, 47*q*. The difference between the two signals is obtained by adder 48*d*, 48*q*, to calculate the disturbance.

At the next stage, adder 49*d*, 49*q* obtains the deviation between the disturbance calculated above and the disturbance command value. The disturbance command value is normally set to zero.

At adder 49*d*, 49*q*, the disturbance command value is set to 0, in order to calculate the deviation with the disturbance set as a negative input. The feature that the disturbance is a negative input leads to disturbance suppression.

By this calculation, current command values for harmonic suppression Idn, Iqn are calculated. Signals Ihdref, Ihqref which are to be added to output current command values Idref, Iqref of the current control section are generated by inverse dq transformation by inverse dq transformation part 44 and dq transformation by dq transformation part 51.

It is necessary to determine coefficients Qam, Qbm for enabling the control according to the present invention. Coefficients Qam, Qbm are measured by various methods, for example, by determining from the ratio in power spectrum density between input and output under condition that a Gaussian noise signal is inputted. The following describes the simplest method.

First, the d-axis is defined as a real part, whereas the q-axis is defined as an imaginary part. By this, amplitude change and phase change which define a transfer characteristic are expressed in a complex number form.

Figure 6:
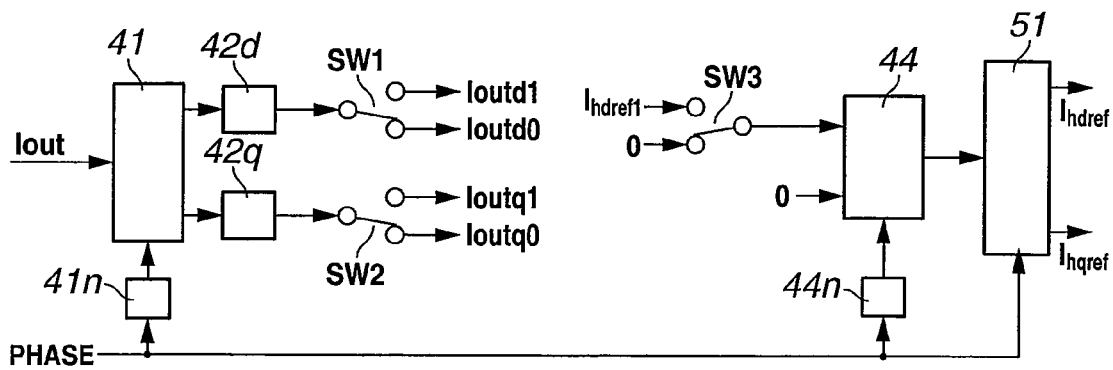
FIG. 6 is a configuration diagram of an open loop of the harmonic suppression control section during coefficient measurement according to the first embodiment of the present invention.

Next, the harmonic suppression control section in FIG. 1C is modified into an open loop as shown in FIG. 6. FIG. 6 shows an open loop configuration of harmonic suppression control section 40 when coefficients Qam, Qbm are measured. The d-axis and q-axis current command values of the n-th order harmonic are set to zero (the d-axis and q-axis current command values which are inputted into inverse dq transformation part 44 are set zero by turning the switch SW3 to the lower side), and the power conversion device 10 is operated. At that time, the d-axis and q-axis n-th order harmonic measured values of filter output currents Iout are represented by Ioutd0, Ioutq0. After measurement of Ioutd0, Ioutq0, all of switches SW1-SW3 in FIG. 6 are turned to the upper side, so that the d-axis current command value is shifted to Ihdref1, and d-axis and q-axis nth-order harmonic Ioutd1, Ioutq1 of filter output current Iout is measured. The foregoing measurement makes it possible to express the transfer characteristic Pam+jPbm from current command value to measurement by the following equation (3).

$$P_{am} + jP_{bm} = \frac{(I_{outd1} - I_{outd0}) + j(I_{outq1} - I_{outq0})}{I_{hdref1}} \quad (3)$$

Pam represents an output in phase with input command value, and Pbm represents an output advanced by 90 degrees in phase with respect to input command value. The inverse characteristic Qam+jQbm is the reciprocal of the transfer characteristic Pam+jPbm as in the following equation (4).

$$Q_{am} + jQ_{bm} = \frac{1}{P_{am} + jP_{bm}} = \frac{P_{am} - jP_{bm}}{P_{am}^2 + P_{bm}^2} \quad (4)$$

When the n-th harmonic measured values of Iout are Ioutd, Ioutq, the transfer characteristic can be cancelled by the following calculation.

$$(I_{outd} + jI_{outq})(Q_{am} + jQ_{bm}) = (I_{outd}Q_{am} - I_{outq}Q_{bm}) + j(I_{outq}Q_{am} + I_{outd}Q_{bm}) \quad (5)$$

Generally, if the phase delay of control feedback reaches 180 degrees, it becomes a positive feedback, so that the control is effective for undesirably increasing the harmonic current. In contrast, since the control method according to the present invention can cancel the phase delay by the calculation of equation (5), it is possible to perform stable harmonic suppression under any system condition. When the order of the harmonic is high, phase delay due to control delay tends to become a significant factor to make the control unstable. In contrast, according to the control method of the present invention, since the transfer characteristic including control delay is measured, the harmonic can be stably suppressed even if the order of the harmonic is high.

In the control method according to the present invention, the transfer function is expressed in complex number form. The conventional method of measuring the transfer function requires complex calculation where the order of the transfer function is estimated by finding the number of resonance points, and then the coefficient for each order is estimated from the measurement result by the method of least square or the like. In contrast, the feature that the transfer function is expressed in complex number form, makes it possible to identify the transfer characteristic by amplitude change and phase change, and thereby makes it possible to determine the transfer characteristic by simple measurement method and calculation.

Moreover, control methods other than the present invention requires to design the frequency band and characteristic of the filter adapted for harmonic suppression. The design requires a complex procedure of varying parameters by trial and error with simulation or actual device, and calculating parameters based on measurement of characteristics of all of devices and loads connected to the system, and the like. In contrast, the control method of the present invention requires only two parameters, i.e. amplitude change and phase change, and makes it possible to determine the parameters by further simple measurement.

Moreover, since the control of the present invention includes disturbance observer compensation by disturbance observer 43, the accuracy of coefficients Qam, Qbm does not need to be high. The errors of coefficients Qam, Qbm are handled as disturbances by disturbance observer 43, and the errors are reflected to the deviations in the disturbance observer, and compensated.

For example, if the phase is correct, it is possible to suppress the harmonic even when the amplitude is three times a suitable value, although overshooting occurs. If the amplitude is correct, suppression is possible even when the phase has an error of 60 degrees, although it takes much time. Accordingly, stable operation is possible even when some system variation occurs. If a significant condition change occurs, recovery can be made only by temporarily stopping the device, and measuring Qam, Qbm again.

Embodiment 2

Figure 2:
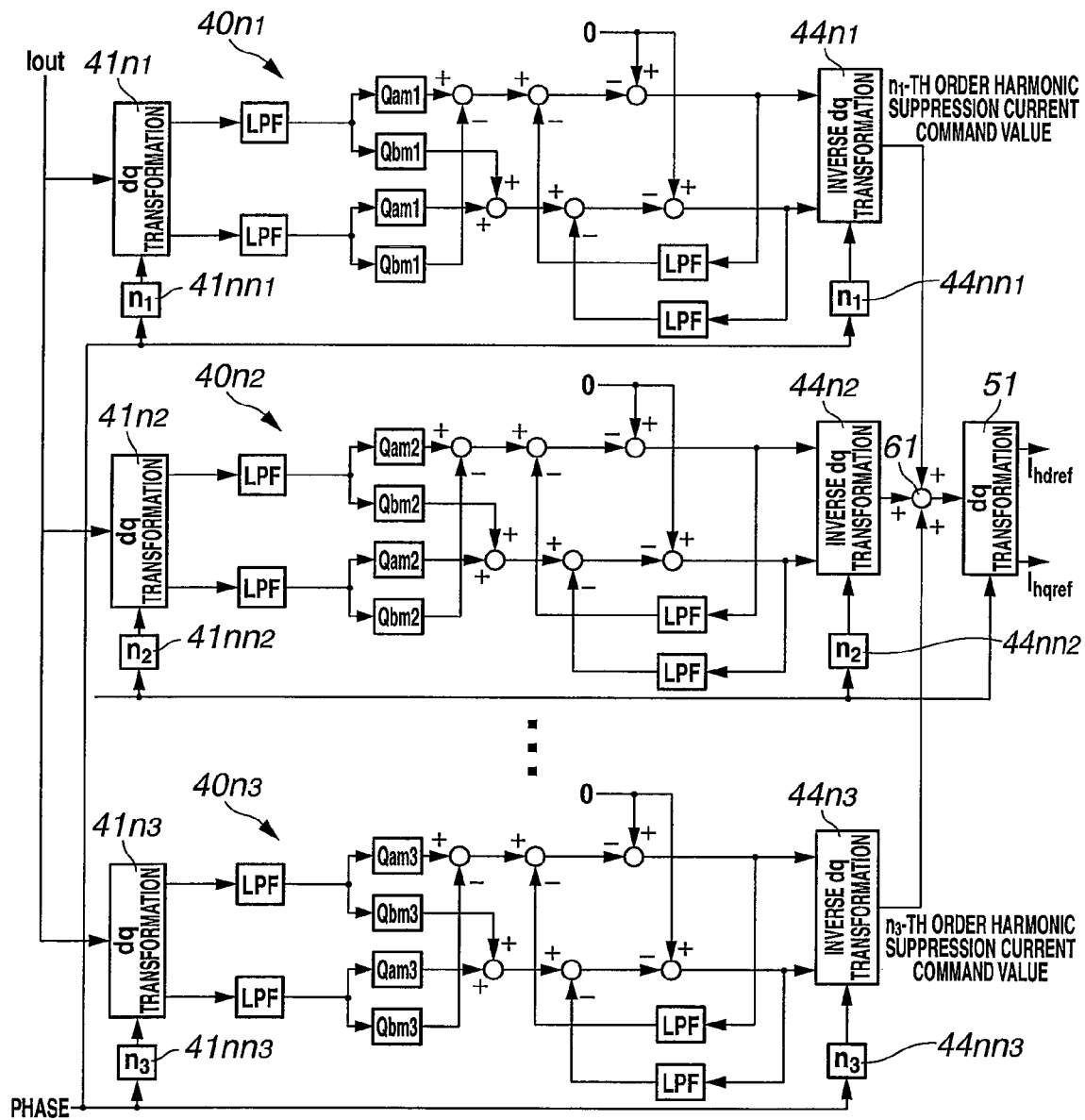
FIG. 2 is a configuration diagram of a harmonic suppression control section for power conversion device according to a second embodiment of the present invention.

FIG. 2 shows configuration of a harmonic suppression control section according to a second embodiment. The second embodiment is adapted to suppression of a plurality of orders of harmonics. The harmonic suppression control section shown in FIG. 1C is provided for each of a plurality of orders of harmonics. The other part is configured in the same manner as in the first embodiment.

In FIG. 2, three harmonic suppression control sections 40*n*1-40*n*3 are configured as in FIG. 1C, and output n1-th to n3-th order harmonic suppression current command values which are summed at an adder 61, and dq transformed by dq transformation part 51 to obtain harmonic suppression current command values Ihdref, Ihqref, which are inputted into the current control section of FIG. 1B.

Reference signs are omitted from the figure for parts of harmonic suppression control sections 40n1-40n3.

In the second embodiment, the harmonic suppression current command value of each order after inverse dq transformation by dq transformation part 44n1, 44n2, 44n3 is summed at adder 61, and the sum is dq-transformed into a command value for current control. The feature that dq transformation part 41n1-41n3 performs DFT (Discrete Fourier Transformation) calculation to completely cancel the interference with harmonics of different orders, serves to suppress a plurality of orders of harmonics. Although the circuit of FIG. 2 suppresses harmonics of three kinds of frequency, harmonics of more orders can be suppressed if the calculating ability of CPU or the like of the control circuit is sufficient. Coefficients Qam, Qbm are different for each order, and thereby require to be measured proactively. In the case where coefficients Qam, Qbm are calculated for a plurality of orders of harmonics as in the second embodiment, it is possible to determine the coefficients by simultaneously outputting a plurality of orders of harmonics and inputting command values, because there is no interference between different order harmonics.

Embodiment 3

Figure 3:
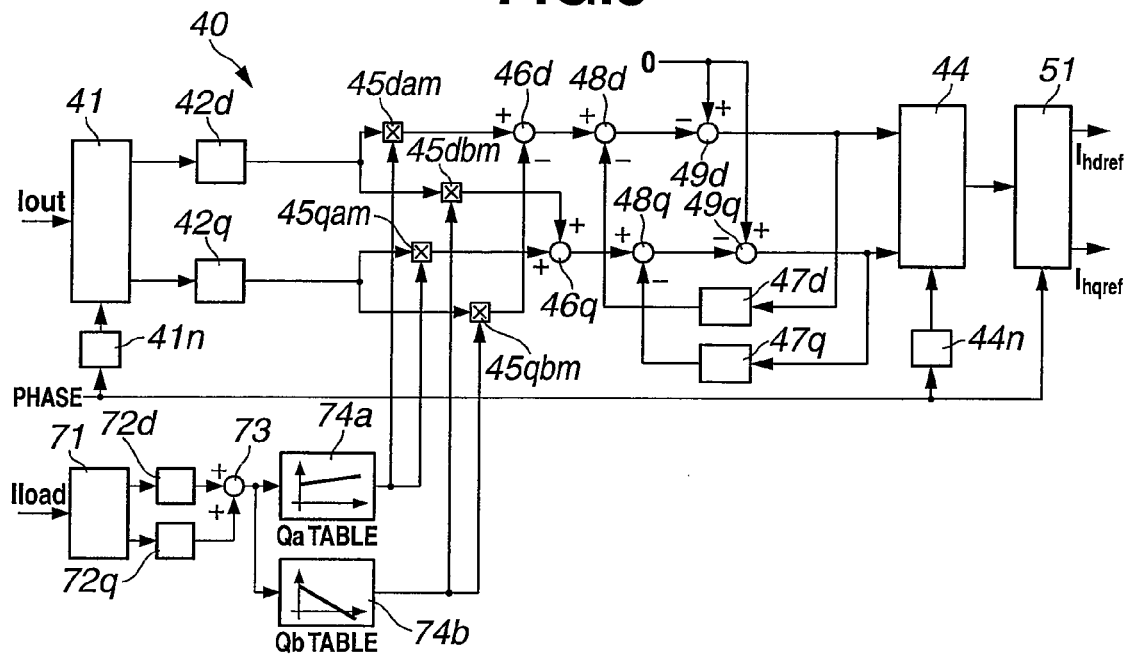
FIG. 3 is a configuration diagram of a harmonic suppression control section for power conversion device according to a third embodiment of the present invention.

FIG. 3 shows configuration of a third embodiment. The third embodiment is configured by addition of a dq transformation part 71, square calculators 72d, 72q, an adder 73, and tables 74a, 74b. The dq transformation part 71 inputs load current Iload into the harmonic suppression control section of the first embodiment (harmonic suppression control section 40 in FIG. 1C). Square calculators 72d, 72q receive input of d-axis load current Idload and q-axis load current Iqload after conversion of dq transformation part 71, respectively, and calculate a square of d-axis load current Idload and a square of q-axis load current Iqload. Adder 73 sums the square values Idload$^2$ and Iqload$^2$ which are outputted by square calculators 72d, 72q. Tables 74a, 74b calculate coefficients Qa and Qb from coefficients Qam, Qbm which has been proactively measured with respect to variation of load, based on the square value Idload$^2$+Iqload$^2$ which is outputted by adder 73.

Tables 74a, 74b provide Qam, Qbm which have been proactively measured with respect to variation of load. The coefficients of multipliers 45dam, 45dbm, 45qam, 45qbmn are set by sensing the load current and reading from tables 74a, 74b the coefficients Qam, Qbm conformed to the load current. Accordingly, even when load variation causes changes in coefficients Qam, Qbm, it is possible to suppress harmonics constantly stably by reading Qam, Qbm from the tables as occasion arises.

According to the third embodiment, if the system condition is known although the system condition varies significantly, the provision of tables 74a, 74b covering such variation allows to omit re-measurement of coefficients Qam, Qbm based on test operation.

Embodiment 4

Figure 4A:
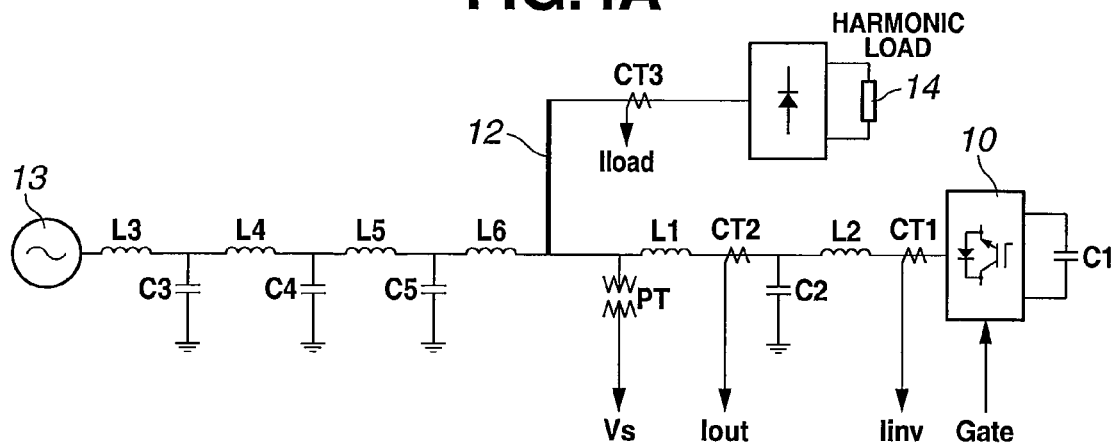
FIG. 4 is a configuration diagram showing an application of harmonic suppression control for power conversion device according to a fourth embodiment of the present invention to an active filter.
Figure 4B:
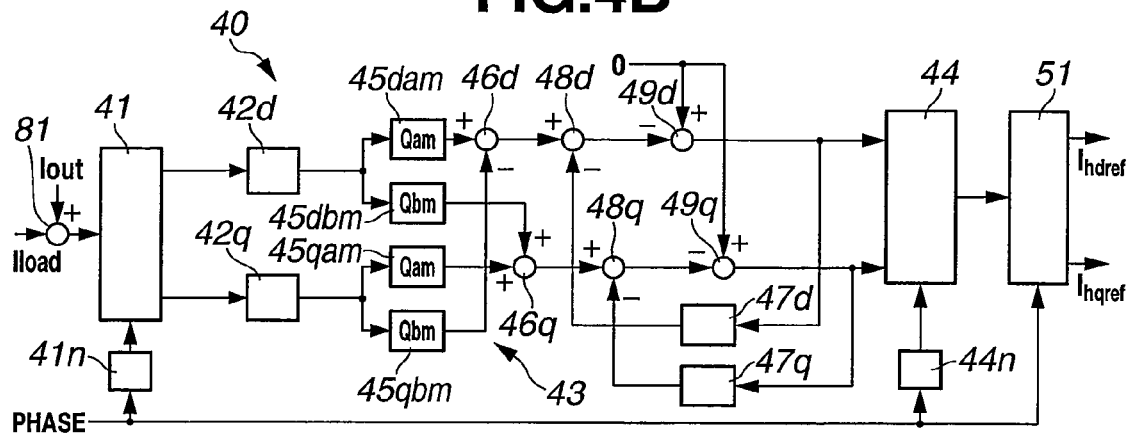

FIG. 4 shows configuration of a fourth embodiment. In the fourth embodiment, the present invention is applied to an active filter. The current control section has the same configuration as in the first embodiment, so it is omitted from the figure. The fourth embodiment differs from the first embodiment in that a current sensor CT3 is added to sense load current Iload as shown in FIG. 4A that shows a main circuit, and the input to the harmonic suppression control section is changed from only filter output current Iout to Iload+Iout as shown in FIG. 4B which shows a harmonic suppression control section.

In the fourth embodiment, the coefficients (Qam, Qbm) of multipliers 45dam, 45dbm, 45qam, 45qbm of the harmonic suppression control section are set as an inverse function of a transfer characteristic from harmonic suppression control command value to Iload+Iout. This makes it possible to control the harmonic current of Iload+Iout to zero, and set the harmonic current flow to alternating current power supply 13 to zero.

Since the control of the present invention uses the method of sensing a specific order harmonic and suppressing the harmonic, a plurality of orders of harmonics can be suppressed by parallel arrangement of a plurality of harmonic suppression control sections based on combination with the second embodiment, in the case of application to the active filter. For example, when harmonics of the orders 2 to 25 are suppressed, it is sufficient that eight kinds of harmonic suppression control are arranged in parallel where n=−5, 7, −11, 13, −17, 19, −23, 25, in consideration of characteristics of typical three-phase alternating current circuit. It may be configured so that only harmonics of orders whose currents are large are selected and the corresponding harmonic suppression controls are arranged in parallel.

Embodiment 5

Figure 5A:
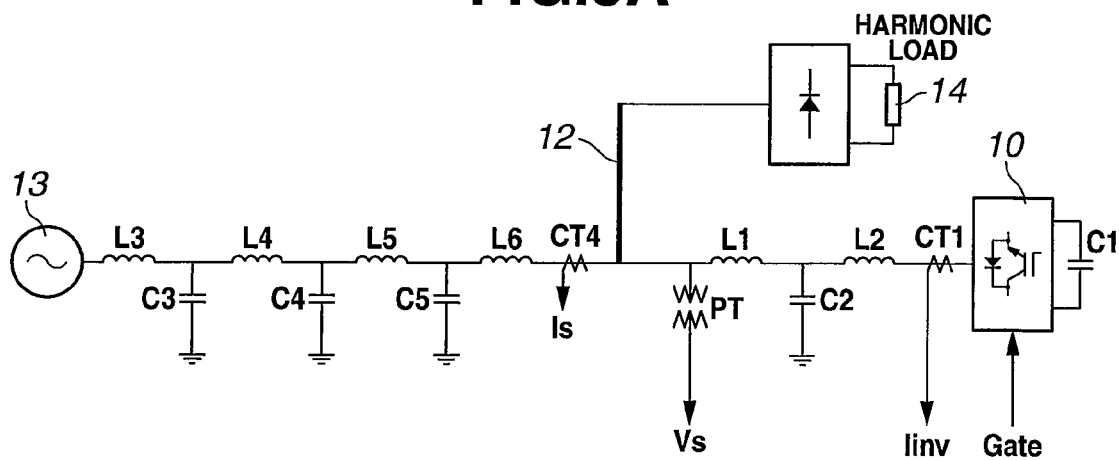
FIG. 5 is a configuration diagram showing an application of harmonic suppression control for power conversion device according to a fifth embodiment of the present invention to an active filter.
Figure 5B:
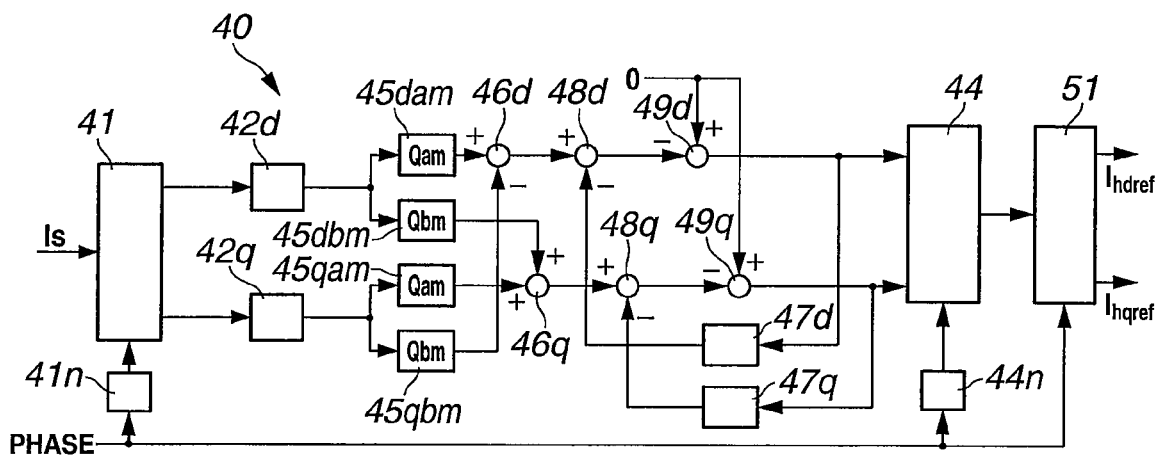

FIG. 5 shows configuration of a fifth embodiment. In the fifth embodiment, the present invention is applied to an active filter as in the fourth embodiment. However, as compared to the fourth embodiment, the fifth embodiment has a modified configuration that the current sensing target is changed from load current Iload and output current Iout to system current Is provided by current sensor CT4. The current control section has the same configuration as in the first embodiment, so it is omitted from the figure. FIG. 5A shows a main circuit, and FIG. 5B shows a harmonic suppression control section.

Accordingly, it is possible to reduce the number of required current sensors CT. In cases where the interconnection point of the system is connected to an element other than a harmonic load and an active filter, the current flowing into another load or device is superimposed on system current Is, leading to Is≠Iload+Iout, so that the values of coefficients Qam, Qbm are different from those in the fourth embodiment. Accordingly, in the fifth embodiment, the coefficients Qam, Qbm of multipliers 45dam, 45dbm, 45qam, 45qbm of the harmonic suppression control section are set as an inverse function of a transfer characteristic from harmonic suppression current command value to Is. This makes it possible to control the harmonic current of system current Is to zero, and set the harmonic current flow to alternating current power supply 13 to zero.

Also in the fifth embodiment, it is possible to obtain similar effects as in the fourth embodiment only with measurement of coefficients Qam, Qbm.

As in the fourth embodiment, a plurality of orders of harmonics can be suppressed by parallel arrangement of a plurality of harmonic suppression control sections based on combination with the second embodiment, in the case of application to the active filter. For example, when harmonics of the orders 2 to 25 are suppressed, it is sufficient that eight kinds of harmonic suppression control are arranged in parallel where n=−5, 7, −11, 13, −17, 19, −23, 25, in consideration of characteristics of a typical three-phase alternating current circuit. It may be configured so that only harmonics of orders whose currents are large are selected and the corresponding harmonic suppression controls are arranged in parallel.

Embodiment 6

In the sixth embodiment, the configuration of FIG. 4 or FIG. 5 is modified so that the order n of the harmonic in dq transformation part 41 of harmonic suppression control section 40 is set as n=−1, so that the harmonic suppression current command value calculated by harmonic suppression control section 40 is an opposite phase component of fundamental wave, and the opposite phase component of fundamental wave of the load current is compensated.

In cases where the load is in three-phase unbalance, the setting of n=−1 makes it possible to compensate an unbalanced component of the load current, and bring the system current into balance. Merely setting of n=−1 is directed to unbalance compensation only, where the active filter function is not performed as in the fourth and fifth embodiments. In order to add an active filtering function, it is necessary to add blocks of harmonic suppression current control sections in parallel where n is set as n=−5, 7, . . . as in the second embodiment.

Specifically, for example, it is assumed that the orders n of harmonic suppression control sections 40n1, 40n2, 40n3 are n=−5, n=7, n=−11, and it is an active filter for suppression compensation for three kinds.

In this configuration, by setting the harmonic suppression order n of harmonic suppression control section 40n1 as n=−1, harmonic suppression control section 40n1 performs unbalance compensation, and harmonic suppression control section 40n2 performs suppression compensation for the opposite phase component of the seventh order harmonic, and harmonic suppression control section 40n3 performs the eleventh order harmonic compensation.

Alternatively, in this configuration, by setting the harmonic suppression order n of harmonic suppression control section 40n2 as n=−1, so that harmonic suppression control section 40n1 performs suppression compensation for the fifth order harmonic, and harmonic suppression control section 40n2 performs unbalance compensation, and harmonic suppression control section 40n3 performs the eleventh order harmonic compensation.

Embodiment 7

The condition for resonance among capacitors, transformers, and loads in an AC filter system frequently changes. This can be caused by merely adding a power conversion device provided with an LC filter or turning on/off a force-factor improving capacitor or load change. If the load includes L or C, the resonance frequency significantly changes so that it becomes necessary to stop the device and perform test operation. If the change condition is known, provision of a table may be directed to system change. However, if the change condition is complicated, the size of the table increases, and the number of measurement conditions increases, so that it takes much time to complete test operation. Moreover, this cannot cover unknown system changes. If the load is a nonlinear load, mere variation of output current of the power conversion device may cause a change in characteristic. Accordingly, application to such a load is difficult.

Even by the method disclosed in patent document 2, if the system condition changes, it is necessary to adjust the phase offset of inverse dq transformation again. If the system condition changes frequently, it is necessary to stop the device and measure a suitable phase offset every time the change occurs.

Figure 7:
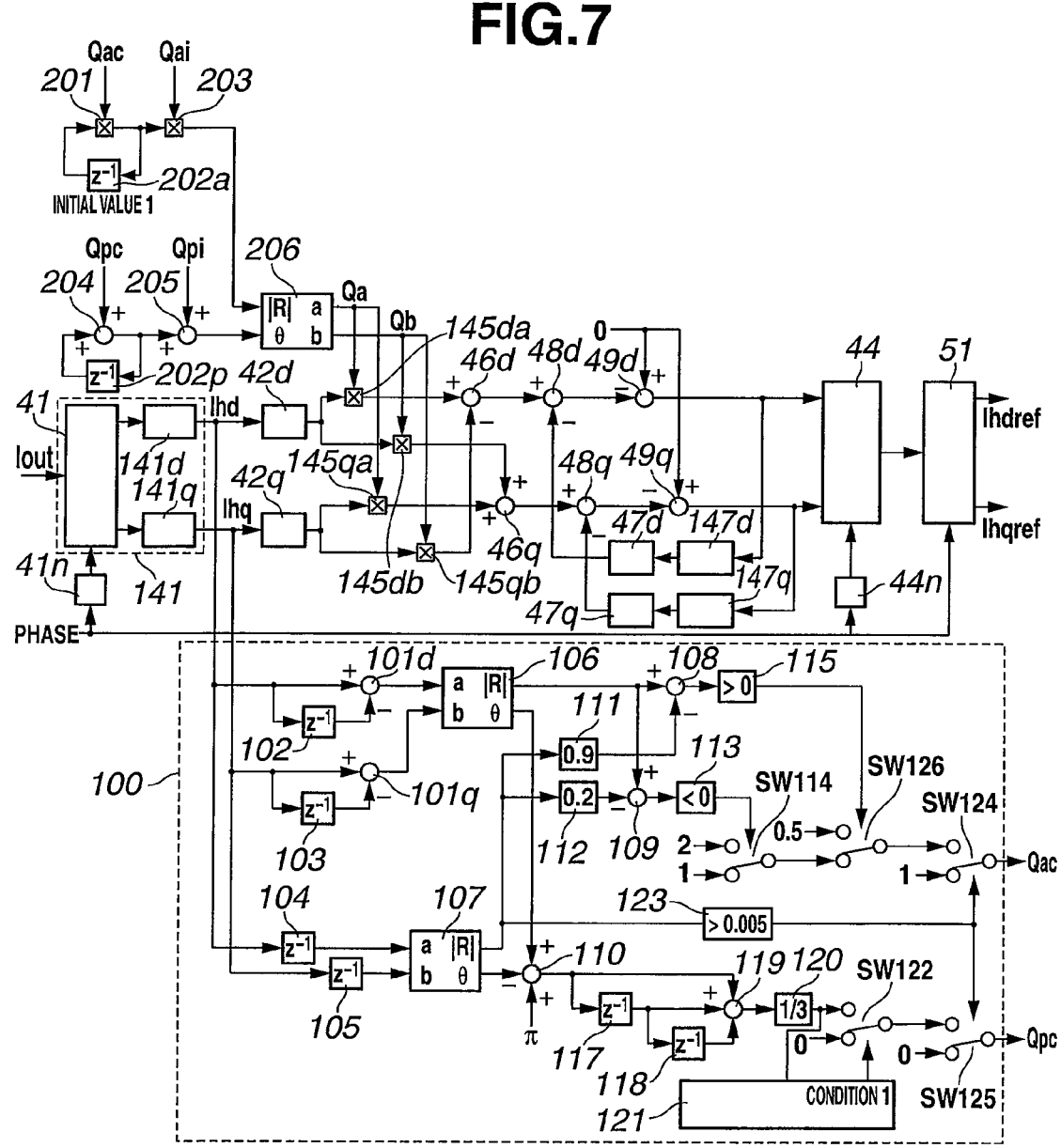
FIG. 7 is a configuration diagram of a power conversion device according to a seventh embodiment of the present invention.

In the seventh embodiment, as shown in FIG. 7, the harmonic suppression control section is provided with a function of correcting the coefficient that is an inverse function of a transfer function from harmonic suppression current command value to measured value of output current.

In the seventh embodiment, the coefficient Qdam, Qqam, Qam and the coefficient Qdbm, Qqbm, Qbm which are set by disturbance observer 43 of harmonic suppression control section 40 are treated as Qa and Qb, respectively.

For ease of understanding of correction operation, coefficients Qa, Qb are applied with polar coordinate transformation, and then inputted.

FIG. 7 shows configuration of the seventh embodiment. The main circuit and current control section are similar as in FIGS. 1A, 1B, and omitted from the figure. The same reference signs are given to common parts between the first embodiment and seventh embodiment.

In FIG. 7, the output side of dq transformation part 41 is provided with average processing parts 141d, 141q for performing average processing based on filtering, which constitute a DFT calculation section 141.

In the seventh embodiment, DFT calculation section 141 constitutes a discrete Fourier transformation section of the present invention.

The sensed harmonic component outputted by DFT calculation section 141 is inputted into LPFs 42d, 42q, and also into a coefficient correction amount calculation section 100.

The LPFs 42d, 42q are implemented by a first order delay filter having a time constant of 20 ms in this example.

A multiplier 201 multiplies a coefficient amplitude correction amount Qac by a one cycle delayed correction amount, wherein coefficient amplitude correction amount Qac is calculated by coefficient correction amount calculation section 100, and the one cycle delayed correction amount is calculated by a $Z^{-1}$ calculator 202a. The output of multiplier 201 is multiplied by an initial value Qai of the coefficient (amplitude) at a multiplier 203.

An adder 204 sums a coefficient phase correction amount Qpc and a one cycle delayed correction amount, wherein coefficient phase correction amount Qpc is calculated by coefficient correction amount calculation section 100, and the one cycle delayed correction amount is calculated by a $Z^{-1}$ calculator 202a. The output of adder 204 is added to an initial value Qpi of the coefficient (phase) at an adder 205.

A polar coordinate transformation part 206 receives input of the output of multiplier 203 and the output of adder 205, and applies the outputs with polar coordinate transformation to output coefficients Qa, Qb.

A multiplier 145da multiplies the output of LPF 42d by the coefficient Qa. A multiplier 145db multiplies the output of LPF 42d by the coefficient Qb. A multiplier 145qa multiplies the output of LPF 42q by the coefficient Qa. A multiplier 145qb multiplies the output of LPF 42q by the coefficient Qb. The outputs of multipliers 145d, 145db, 145qa, 145qb are inputted into adders 46d, 46q as in FIG. 1C.

The input sides of LPFs 47d, 47q that serve to feedback the d-axis harmonic suppression signal Idn and q-axis harmonic suppression current command value Iqn are provided with average processing parts 147d, 147q, respectively, as in the case of LPFs 42d, 42q.

In coefficient correction amount calculation section 100, an adder 101d acquires a deviation between the current d-axis harmonic measured value Ihd outputted by DFT calculation section 141 and the one-cycle-delayed harmonic measured value that is calculated from Ihd by $Z^{-1}$ calculator 102.

An adder 101q acquires a deviation between current q-axis harmonic measured value Ihq outputted from DFT calculation section 141 and the one-cycle-delayed harmonic measured value that is calculated from Ihq by $Z^{-1}$ calculator 103.

A $Z^{-1}$ calculator 104 calculates a one-cycle delayed harmonic measured value of d-axis harmonic measured value Ihd, and a $Z^{-1}$ calculator 105 calculates a one-cycle delayed harmonic measured value of q-axis harmonic measured value Ihq.

The output of adder 101d, 101q is a change amount from one-cycle delayed value to the current value of the harmonic component. The output of $Z^{-1}$ calculator 104, 105 is a one-cycle delayed harmonic measured value. The change amount and one-cycle delayed harmonic measured value are applied with polar coordinate transformation by polar coordinate transformation part 106, 107 and then compared by adders 108-110.

Specifically, at adder 108, the output of polar coordinate transformation part 106 is set as a positive input, and the output of polar coordinate transformation part 107 is multiplied by 0.9 by multiplier 111 and set as a negative input, where the amplitude of the harmonic vector is compared.

At adder 109, the output of polar coordinate transformation part 106 is set as a positive input, and the output of polar coordinate transformation part 107 is multiplied by 0.2 by multiplier 112 and set as a negative input, where the amplitude of the harmonic vector is compared.

At adder 110, the output of polar coordinate transformation part 106 is set as a positive input, and the output of polar coordinate transformation part 107 is set as a negative input, and n is further set as a positive input, where the phase of the harmonic vector is compared.

An evaluator 113 evaluates whether or not the output of adder 109 is smaller than zero (whether or not the change amount of amplitude described below exceeds 90%). When the output of adder 109 is smaller than zero, an amplitude correction amount switching switch SW114 is switched to the side of 2 times.

An evaluator 115 evaluates whether or not the output of adder 108 is larger than zero (whether or not the change amount of amplitude described below exceeds 20%).

When the output of adder 108 is larger than zero, an amplitude correction amount switching switch SW116 is switched to the side of 0.5 times.

A $Z^{-1}$ calculator 117 calculates one-cycle-delayed component of phase error φ that is outputted from adder 110. A $Z^{-1}$ calculator 118 calculates one-cycle-delayed component of the output of $Z^{-1}$ calculator 117.

An adder 119 calculates a three-period sum of phase error φ that is outputted from adder 110.

An average processing part 120 calculates a three-period moving average of phase error φ of the output of adder 119.

An evaluator 121 evaluates whether or not variation of the moving average that is outputted from average processing part 120 is smaller than or equal to n/6. When the variation is smaller than or equal to n/6, a phase correction amount switching switch SW122 is switched to the side of average processing part 120.

An evaluator 123 evaluates whether or not the output (harmonic) of polar coordinate transformation part 107 is smaller than or equal to 0.5%. When it is smaller than or equal to 0.5%, amplitude correction amount switching switch SW124 is switched to the side of once, and phase correction amount switching switch SW125 is switched to the side of zero.

The correction amount which is set by switching switches SW114, SW116, SW124 is inputted as a coefficient amplitude correction amount Qac into multiplier 201.

The correction amount which is set by switching switches SW122, SW125 is inputted as a coefficient phase correction amount Qpc into adder 204.

The following describes operation of the device configured as described above. First, the coefficient input section is described. Initial values of the coefficients are set as Qai, Qpi. The initial values are determined, for example, by measurement of response with respect to input of a harmonic as in the first embodiment.

Qac, Qpc are correction amounts of coefficient, but used while being unchanged from the initial value before operation of the control, so that Qac, Qpc are equal to 1, 0, respectively (the switching switch SW124 is on the side of 1, and the switching switch SW125 is on the side of 0). Accordingly, the initial values are unchanged and inputted into polar coordinate transformation part 206.

Polar coordinate transformation part 206 determines coefficients Qa, Qb by performing the following calculation.

$Qa = Qai \cdot \cos(Qpi), Qb = Qai \cdot \sin(Qpi)$

These Qa, Qb are used to cancel the transfer characteristic and perform harmonic suppression control.

The following describes the correction function of coefficients Qa, Qb. The harmonic vector after transformation to direct current value signal by DFT calculation section 141 is applied with polar coordinate transformation by polar coordinate transformation part 106, 107 into a complex plane. The harmonic vector is implemented by the following two kinds:
one-cycle-delayed harmonic measured value, and
change amount from one-cycle-delayed harmonic measured value to current value.

The amplitude and phase of the two vectors are compared at adders 108-110, to determine the correction amounts of the amplitude and phase of Qa, Qb, and set the same as Qac, Qpc.

The set values are stored in a buffer not shown, and coefficient phase correction amount Qpc is added to initial value Qpi at adder 205, to correct the phase of Qa, Qb. Coefficient amplitude correction amount Qac is multiplied by initial value Qai at multiplier 203, to correct the amplitude of Qa, Qb.

The following describes operation of the harmonic suppression control section.

Figure 8:
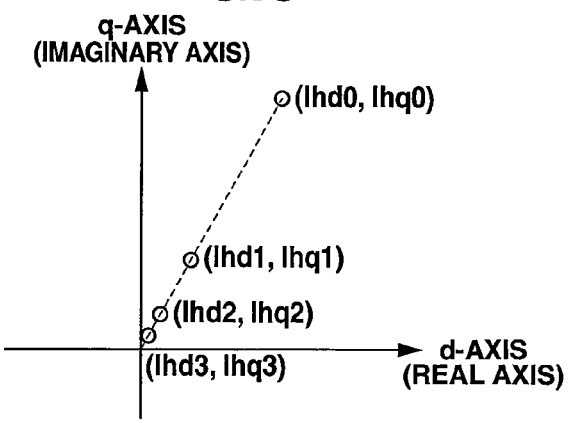
FIG. 8 is an illustration diagram showing a situation where a harmonic current measured value changes under condition that control is activated under an optimal condition.

FIG. 8 shows how the harmonic measured value provided by DFT from filter output current Iout changes, when the control is made effective under condition that the coefficients Qa, Qb are optimal. The d-axis and q-axis current harmonic measured values of filter output current Iout immediately before start of the control are represented by Ihd0, Ihq0, and the current harmonic measured values of filter output current Iout n cycles after the start of the control are represented by Ihdn, Ihqn, and those are plotted on the complex plane. When coefficients Qa, Qb are optimal, the sensed harmonic tracks linearly toward a point of origin, to gradually suppress the harmonic.

Figure 9:
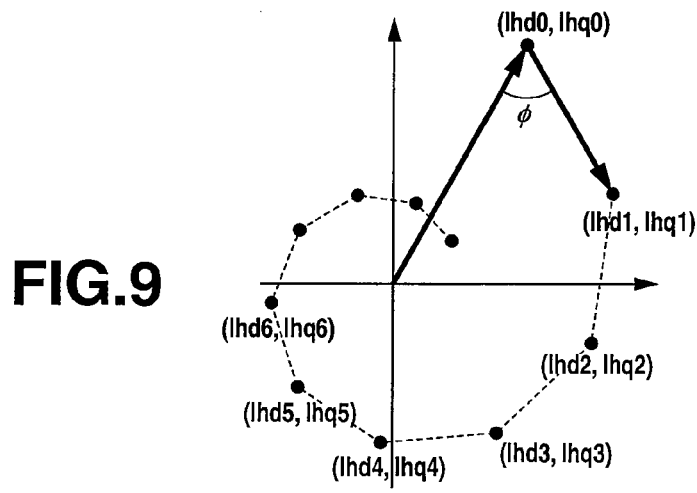
FIG. 9 is an illustration diagram showing a situation where a harmonic current measured value changes under condition that phase deviation is 60 degrees.

FIG. 9 shows how the harmonic measured value changes, when the amplitude of coefficients Qa, Qb are optimal, but the phase is deviated by +60 degrees from the optimal value. In FIG. 9, the vector (Ihd1−Ihq0, Ihq1−Ihq0) which indicates an amount of compensation by the control converges while tracking a curve for a long time, with a deviation of phase deviation φ with respect to the segment between the point of origin and the point (Ihq0, Ihq0). This φ corresponds to a phase deviation of coefficients Qa, Qb, and is equal to +60 degrees in this example. In this way, it is possible to determine the phase deviation of coefficients Qa, Qb by measurement of angle φ during compensating operation.

The following vector is required to calculate phase deviation φ:
one-cycle delayed harmonic measured value (Ihd0, Ihq0) (outputted by polar coordinate transformation part 107), and
change amount of harmonic measured value from the one-cycle-delayed value to the current value (Ihd1−Ihd0, Ihq1−Ihq0) (outputted by polar coordinate transformation part 106).

φ can be calculated by the following equation (6).

$$\phi = \pi + arg(I_{hd1}-I_{hd0}, I_{hq1}-I_{hq0}) - arg(I_{hd0}, I_{hq0}) \quad (6)$$

where arg is a sign representing an angle of deviation on complex plane.

The foregoing is based on the assumption that the change of harmonic corresponding to the vector (Ihd1−Ihd0, Ihq1−Ihq0) is caused by the compensation operation.

However, it actually includes a disturbance such as a load variation and a harmonic variation. It is necessary to remove the effect of such a disturbance.

For disturbance removal, first, a three-period moving average is calculated for sensed φ (by average processing part 120).

Next, three-period variation of φ is checked (by evaluator 121). If the variation is large, it is assumed that φ contains an error resulting from a disturbance, and no phase correction is performed (phase correction amount switching switch SW122 is switched to zero). This is a condition 1, which is implemented by a condition that the variation is within ±n/6 in FIG. 7.

Moreover, also if the harmonic is within 0.5% of the nominal (determined by evaluator 123), no phase correction is performed (phase correction amount switching switch SW125 is switched to zero), for the following two reasons.

If the harmonic is within 0.5% of the nominal, it is conceivable that the harmonic suppression can be normally performed and coefficients Qa, Qb are suitable.

If the amplitude is small, the accuracy of polar coordinate transformation is low.

The thus calculated phase deviation φ is set as coefficient phase correction amount Qpc, and the phase correction is performed.

Figure 10:
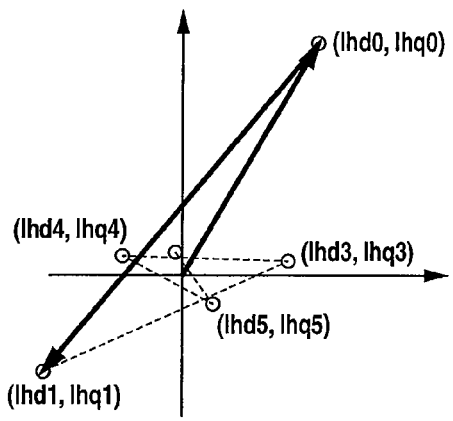
FIG. 10 is an illustration diagram showing a situation where a harmonic current measured value changes under condition that amplitude deviation is 2.5 times and phase deviation is 10 degrees.

On the other hand, FIG. 10 shows how the harmonic measured value changes when the phase of coefficients Qa, Qb is deviated by −10 degrees from the optimal value, and the amplitude is set to 2.5 times of the optimal value. In FIG. 10, the amplitude of the vector (Ihd1−Ihq0, Ihq1−Ihq0) which indicates an amount of compensation by the control is larger than the amplitude of (Ihd0, Ihq0), wherein overshooting occurs in the compensation operation. In this way, it is possible to detect that the amplitude of coefficients Qa, Qb is excessive, by detecting that the amount of compensation exceeds the measured value. Similarly, if the amount of compensation is extremely smaller than the measured value, it means that the amplitude of coefficients Qa, Qb is short.

The behavior of change of the harmonic measured value is changed by the first order delay filters (LPF 42d, 42q) used by DFT calculation section 141 or the filtering of average processing parts 141d, 141q. In FIG. 7, the first order delay filters (LPF 42d, 42q) having a time constant of 20 ms is employed. Accordingly, when coefficients Qa, Qb are suitable, converging behavior is close to the characteristic of the first order delay filter as shown in FIG. 8. In the case of time constant 20 ms, the amplitude of (Ihd1−Ihq0, Ihq1−Ihq0) is equal to about 60% of that of (Ihd0, Ihq0). This is true in the case where there is deviation in the phase of coefficients Qa, Qb.

Accordingly, in FIG. 7, when the amplitude of (Ihd1−Ihq0, Ihq1−Ihq0) is greater than 90% of that of (Ihd0, Ihq0), it is determined (by evaluator 115) that the amplitude is excessive, and the amplitude is multiplied by 0.5 (amplitude correction amount switching switch SW116 is switched to the side of 0.5). Similarly, when the amplitude of (Ihd1−Ihq0, Ihq1−Ihq0) is smaller than 20% of that of (Ihd0, Ihq0), it is determined (by evaluator 113) that the amplitude is short, and the amplitude is multiplied by 2 (amplitude correction amount switching switch SW114 is switched to the side of 2). This serves to make the amplitude approach a suitable value.

Figure 15:
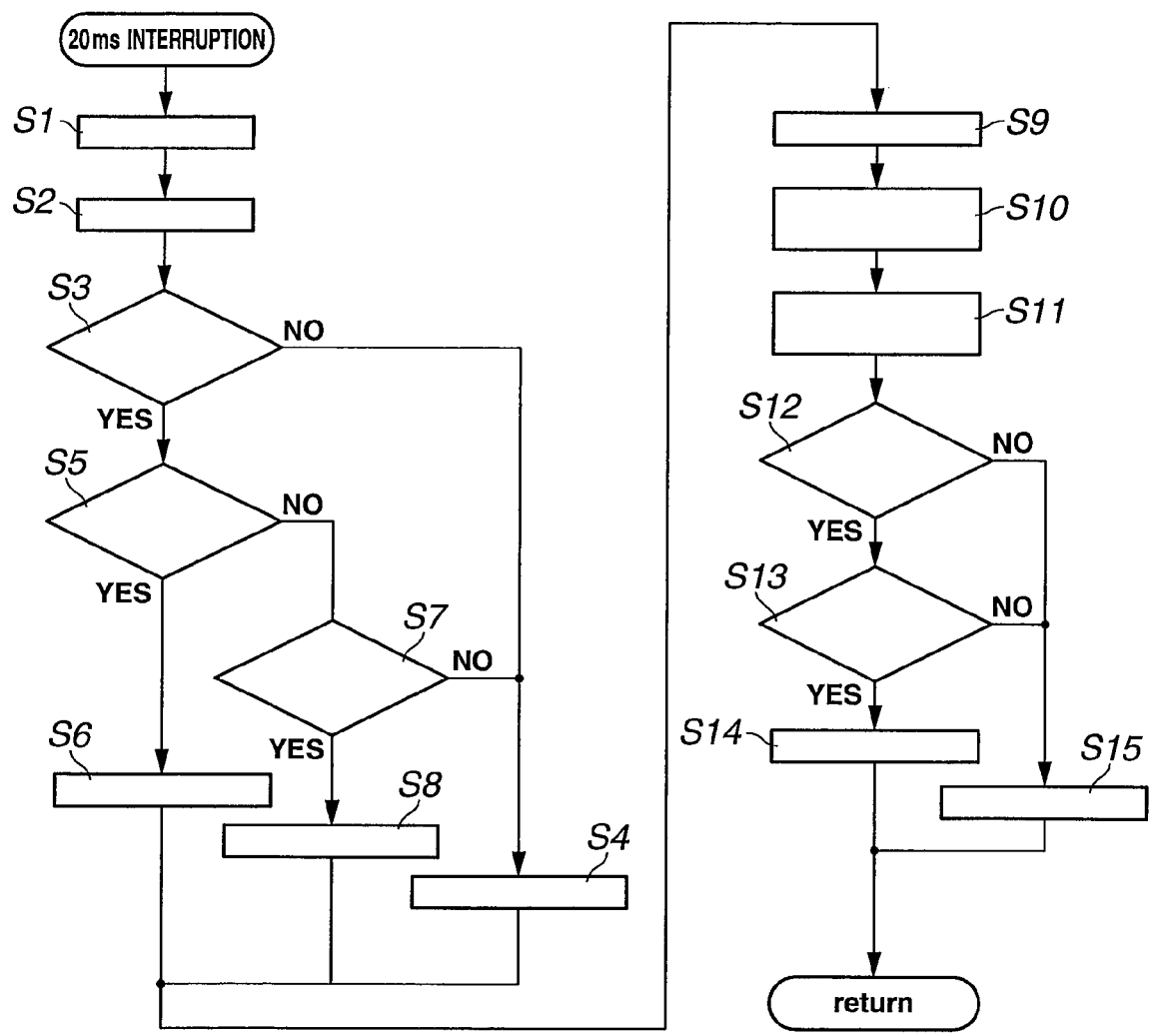
FIG. 15 is a flow chart of a coefficient correction operation in the seventh embodiment.

The foregoing correction operation is shown in the flowchart of FIG. 15.

At Step S1, the harmonic is measured by DFT calculation section 141.

At Step S2, the amount of compensation is detected by polar coordinate transformation parts 106, 107.

At Step S3, it is determined by evaluator 123 whether or not the harmonic is larger than or equal to 0.5%.

At Step S4, when the result of evaluation of Step S3 is NO, the switch SW124 is switched to the side of 1 to set coefficient amplitude correction amount Qac to 1.

At Step S5, when the result of evaluation of Step S3 is YES, it is determined by evaluator 115 whether or not the amplitude of (Ihd1−Ihq0, Ihq1−Ihq0) is greater than 90% of that of (Ihd0, Ihq0).

At Step S6, when the result of evaluation of Step S5 is YES, the switch SW116 is switched to the side of 0.5 to set amplitude correction amount Qac to 0.5.

At Step S7, when the result of evaluation of Step S5 is NO, it is determined by evaluator 113 whether or not the amplitude of (Ihd1−Ihq0, Ihq1−Ihq0) is smaller than 20% of that of (Ihd0, Ihq0). When the result of evaluation of Step S7 is NO, Step S4 is executed.

At Step S8, when the result of evaluation of Step S7 is YES, the switch SW114 is switched to the side of 2 to set amplitude correction amount Qac to 2.

At Step S9, phase deviation φ is measured by adding operation of adder 110.

At Step S10, the three-period moving average of phase deviation φ is calculated by average processing part 120.

At Step S11, variation of the three-period moving average of phase deviation φ is calculated by average processing part 121.

At Step S12, it is evaluated by evaluator 121 whether or not the variation of φ is within n/6.

At Step S13, when the result of evaluation of Step S12 is YES, it is evaluated by evaluator 123 whether or not the harmonic is greater than or equal to 0.5% of the nominal value.

At Step S14, when the result of evaluation of Step S3 is YES, the switching switches SW122, SW125 are switched to the opposite side of zero (the side of average processing part 120), and phase correction amount Qpc is set to φ.

At Step S15, when the results of evaluation of Steps S12, S13 are NO, the switching switches SW122, SW125 are switched to zero, and phase correction amount Qpc is set to zero.

The foregoing correction operation may be modified depending on the object. For example, in a case where it is an object to suppress the occurrence of overshooting, there is a method of setting detection of amplitude shortage in every cycle in a certain period as a condition for amplitude increase, and setting the amount of amplitude increase to a smaller value of 1.5 times.

Moreover, in a case where it is necessary to enhance the accuracy of amplitude of coefficient Qa, Qb, for example, by enhancing the quickness of response of harmonic suppression, the object can be achieved by relaxing the conditions for excessiveness and shortage to "80% or greater" and "50% or smaller", and setting the amplitude adjustment amount to small values of 1.1, 0.9.

The foregoing is for the case where the filtering of DFT calculation section 141 is combined with 50 Hz average processing and LPF. If the filter is different, the harmonic suppression operation also changes. For example, in the case where the 50 Hz moving average is selected as a filter, the amplitude of (Ihd1−Ihq0, Ihq1−Ihq0) becomes equal to that of (Ihd0, Ihq0), if coefficients Qa, Qb are suitable. Accordingly, it is necessary to change the conditions for amplitude correction, for example, by determining that the amplitude is excessive, and setting the amplitude to 0.5 times, when the amplitude of (Ihd1−Ihq0, Ihq1−Ihq0) is greater than or equal to 120% of the amplitude of (Ihd0, Ihq0), and determining that the amplitude is short, and setting the amplitude to 2 times, when the amplitude of (Ihd1−Ihq0, Ihq1−Ihq0) is smaller than 50% of the amplitude of (Ihd0, Ihq0).

According to application of the correction function, it is possible to achieve stable harmonic suppression by automatically correcting Qa, Qb even when amplitude initial value Qai and phase initial value Qpi are not determined carefully.

If the phase deviation is greater than or equal to n/2, the harmonic undesirably increases during some periods after the start of the control. However, even under such a condition, phase deviation of coefficients Qa, Qb can be corrected by measurement of phase deviation φ during compensation operation, so that it is shifted to harmonic suppression operation. Accordingly, under any condition, the harmonic can be suppressed finally, and therefore, test operation can be omitted.

It is assumed that the correction function for coefficients Qa, Qb is performed once during one cycle of the fundamental wave, for the following reasons.

- The DFT calculation uses average processing, and requires the time period of one cycle of the fundamental for measured value updating.
- It is necessary to await the elapse of some time period for calculating the change amount of harmonic measured value.
- The polar coordinate transformation which is used to estimate coefficients Qa, Qb requires a high load of calculation. The load of calculation is reduced by increasing the interval of calculation.

However, in cases where it is desired to shorten the period to complete harmonic suppression or in cases where it is desired to further reduce the load of calculation, the interval of correction may be adjusted depending on the object.

The single harmonic is to be suppressed in the seventh embodiment. However, in cases where a plurality of harmonic suppression control sections are provided as in the second embodiment, every harmonic suppression control section may be provided with the correction function. Moreover, load current Iload may be added to the input of the harmonic suppression control section Iout as in the fourth embodiment, or the input of the harmonic suppression control section Iout may be replaced by the system current as in the fifth embodiment, to make it function as an active filter.

Figure 11:
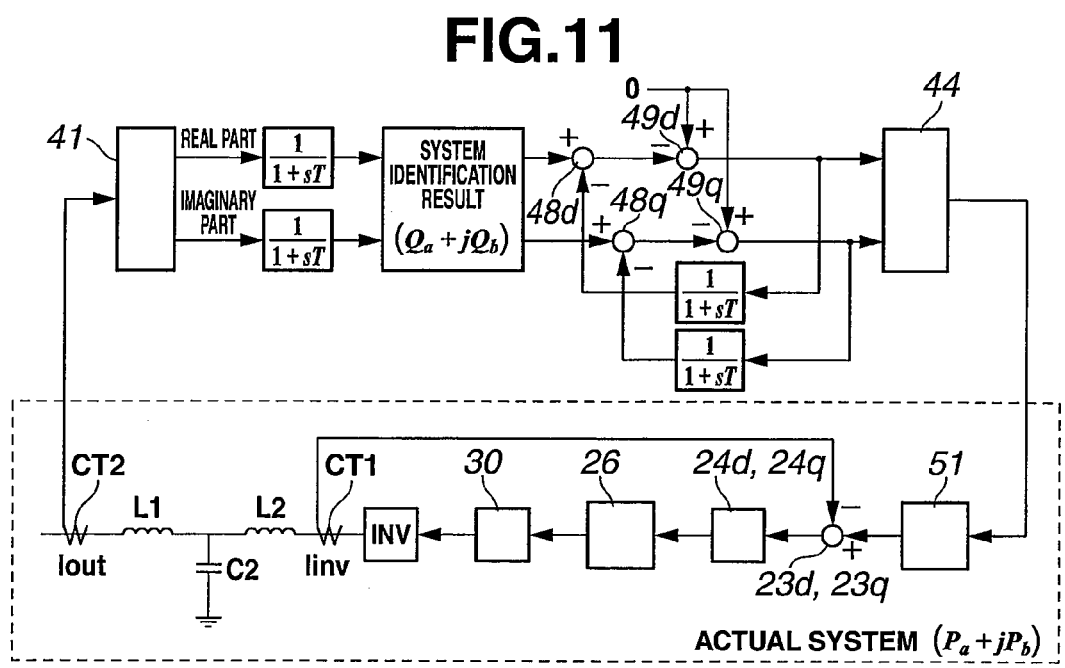
FIG. 11 is a control block diagram according to a seventh embodiment of the present invention, which is simplified by removing a correction function from a harmonic suppression control section.

Finally, the following discusses that the control method of the present invention is correct theoretically. For simplifying the discussion, the average processing used in DFT calculation is omitted, and the LPF is of the first order delay. The correction function is removed from the harmonic suppression control section of FIG. 1, and FIG. 11 shows a simplified control block diagram. In FIG. 11, the same reference signs are given to common parts between FIG. 11 and FIG. 1.

The actual system in FIG. 11 includes command value input, ACR (current control section in FIG. 1B), signal generation by PWM (PWM gate signal generator 30), measurement of filter output current Iout by inverter drive. It is assumed that system identification result $(Q_a+jQ_b)^{-1}$ includes an amplitude error "a" and a phase error φ, and the reciprocal of the actual system and identification error are separated, and it is expressed by the following equation (7).

$$(Q_a+jQ_b)=(P_a+jP_b)^{-1} \times a(\cos\phi + j\sin\phi) \quad (7)$$

Figure 12:
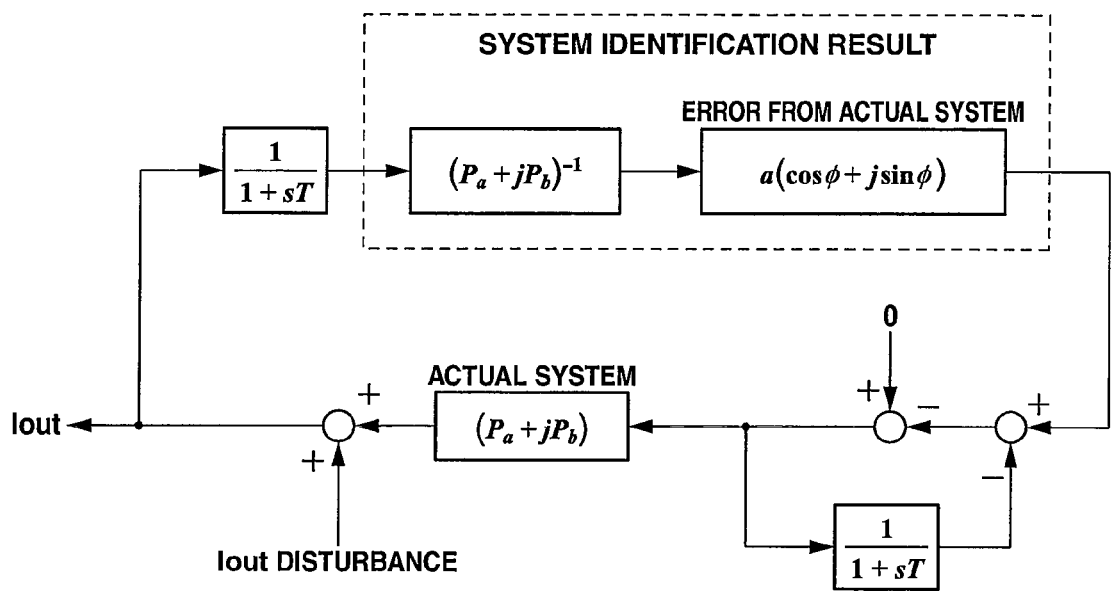
FIG. 12 is a control block diagram created by modifying the block of FIG. 11.
Figure 13:
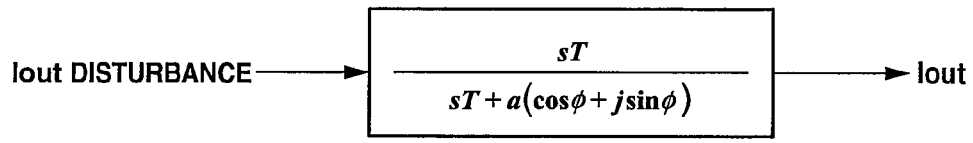
FIG. 13 is an illustration diagram of a transfer function from Iout disturbance to Iout output in the seventh embodiment.

From this result, FIG. 11 is converted to a control block of the harmonic suppression control section in FIG. 12. In FIG. 12, the disturbance of Iout is inputted, although disturbances may be inputted from Iinv or PWM in the actual system in addition to filter output current Iout. When the control block of FIG. 12 is organized, the transfer function from Iout disturbance input to Iout output is expressed by the following equation (8) as shown in FIG. 13.

$$\frac{sT}{sT + a(\cos\phi + j\sin\phi)} \quad (8)$$

Next, the step response of this function is determined. The input is set to a step function of 1/s, and a time-based function is obtained by the Laplace inverse transformation, which is expressed by the following equation (9).

$$i_x(t) + ji_y(t) = \mathcal{L}^{-1}\left[\frac{s}{s + \frac{(a\cos\phi + ja\sin\phi)}{T}} \frac{1}{s}\right] \quad (9)$$

$$= \exp\left[-\frac{(a\cos\phi + ja\sin\phi)}{T}t\right]$$

$$= e^{-\frac{a\cos\phi}{T}t}\left[\cos\left(-\frac{a\sin\phi}{T}t\right) + j\sin\left(-\frac{a\sin\phi}{T}t\right)\right]$$

For the real part, $$i_x(t) = e^{-\frac{a\cos\phi}{T}t}\cos\left(\frac{a\sin\phi}{T}t\right) \quad (10)$$

Similarly, the time-based function of the real part is as follows.

$$i_x(t) = e^{-\frac{a\cos\phi}{T}t}\cos\left(\frac{a\sin\phi}{T}t\right) \quad (10)$$

When this is expressed in the polar coordinate system, $$r_i(t) = \sqrt{i_x(t)^2 + i_y(t)^2} = e^{-\frac{a\cos\phi}{T}t} \quad (12)$$

$$\theta_i(t) = \tan^{-1}\left(\frac{i_y(t)}{i_x(t)}\right) = -\frac{a\sin\phi}{T}t \quad (13)$$

Figure 14:
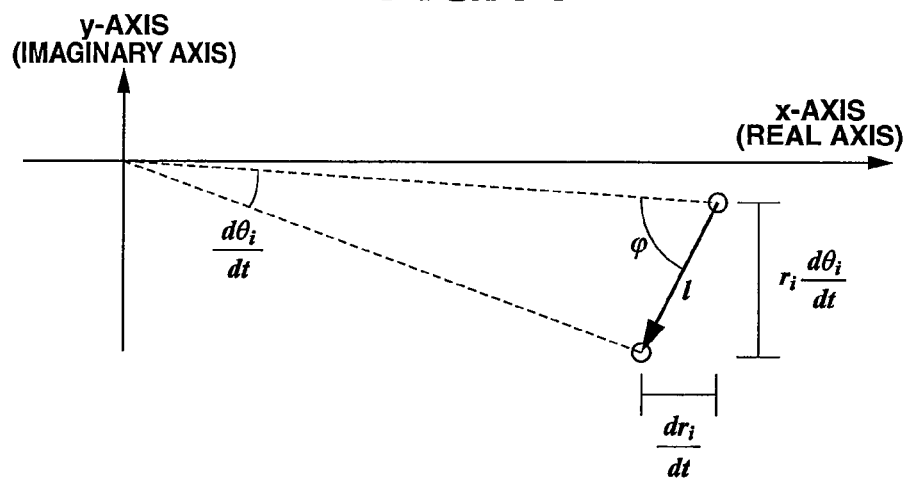
FIG. 14 is an illustration diagram showing change of Iout harmonic measured value in the seventh embodiment.

Here, it is assumed that the harmonic of Iout changes as indicated by an arrow in FIG. 14 in an infinitesimal time interval dt under the control. At the moment, the length of the arrow "l" is expressed by the following equation (14).

$$l = \sqrt{\left(\frac{dr_i}{dt}\right)^2 + \left(r_i\frac{d\theta_i}{dt}\right)^2} \quad (14)$$

$$= \sqrt{\left(\frac{a^2\cos^2\phi}{T^2} + \frac{a^2\sin^2\phi}{T^2}\right)e^{-\frac{2a\cos\phi}{T}t}}$$

$$= \frac{a}{T}e^{-\frac{a\cos\phi}{T}t}$$

The length of the arrow "l" with respect to Iout harmonic measured value ri(t) is expressed by equation (15).

$$\frac{l}{r_i} = \frac{a}{T} \quad (15)$$

Here, T is a time constant of the first order delay filter and given. Accordingly, it is possible to measure the amplitude error "a" between the actual system and identification result by measuring the Iout harmonic measured value $r_i(t)$ and the arrow length "l". The angle ψ of the change amount of the harmonic with respect to the point of origin is expressed by the following equation (16).

$$\varphi = \cos^{-1}\left(-\frac{dr_i}{dt}\bigg/ l\right) \quad (16)$$
$$= \cos^{-1}\left(\frac{a\cos\phi}{T}e^{-\frac{a\cos\phi}{T}t}\bigg/\frac{a}{T}e^{-\frac{a\cos\phi}{T}t}\right)$$
$$= \cos^{-1}(\cos\phi) = \phi$$

Accordingly, it can be understood that the determination of phase error φ between the actual system and identification result can be implemented by merely measuring the angle ψ.

In the control of the present invention, it is possible that the amplitude error "a" and phase error φ are incorrect because the average processing is used in the DFT calculation. However, the provision of the disturbance observer makes it unnecessary to determine the coefficients Qa, Qb with high accuracy, so that there is no effect with the correction operation.

Embodiment 8

Figure 16A:
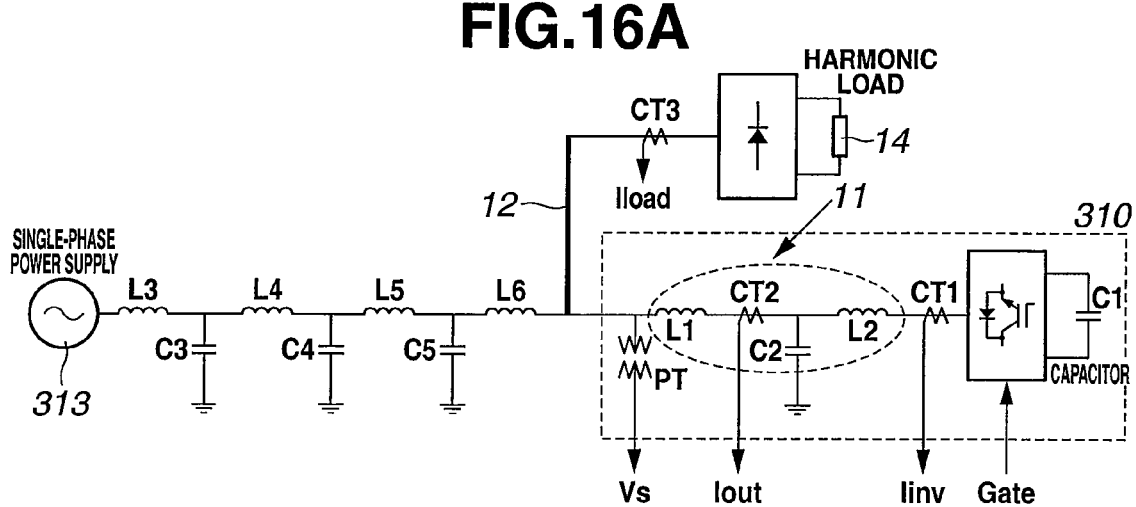
FIG. 16A is a block diagram of a main circuit.
Figure 16B:
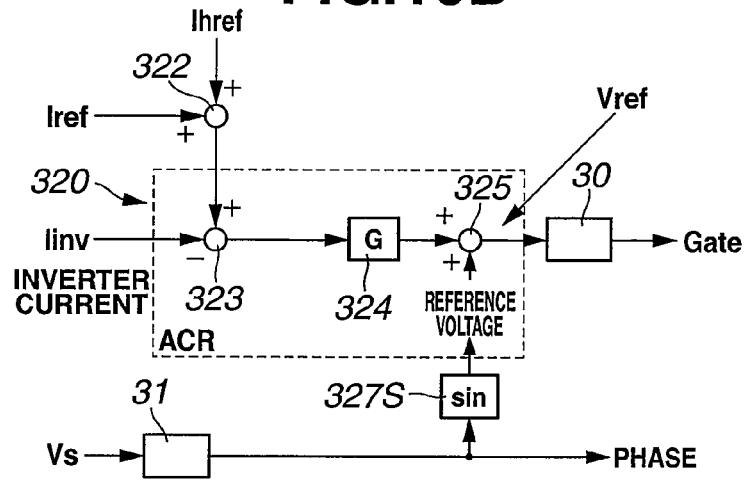
FIG. 16B is a block diagram of a current control section.
Figure 16C:
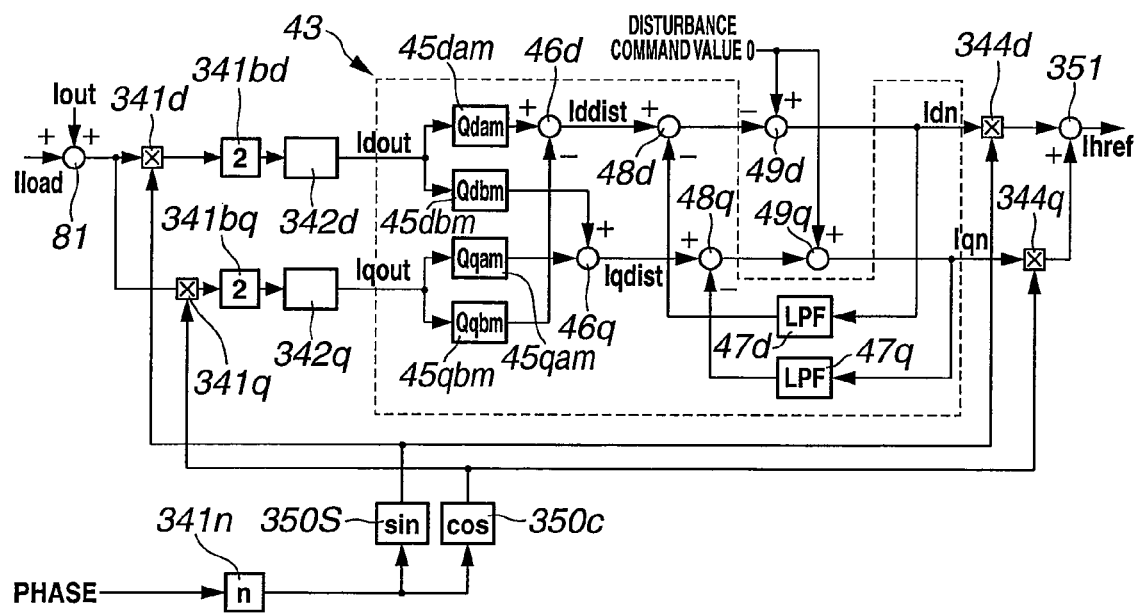
FIG. 16C is a block diagram of a harmonic suppression control section.

FIG. 16 shows configuration of a power conversion device according to an eighth embodiment in which the present invention is applied to an active filter of a single-phase inverter, wherein FIG. 16A shows a main circuit of power conversion device 310, FIG. 16B shows a current control section for controlling the power conversion device 310, and FIG. 16C shows a harmonic suppression control section for controlling the power conversion device 310.

In FIG. 16, the configuration of the fourth embodiment shown in FIGS. 4A, 1B, FIG. 4B is modified into a single-phase configuration, and common parts between FIG. 16 and FIGS. 4A, 1B, FIG. 4B are given the same reference signs.

In FIG. 16A which shows the main circuit, it is different from FIG. 4A in that alternating current power supply 13 is replaced by a single-phase power supply 313, and power conversion device 10 is replaced by a power conversion device 310, wherein power conversion device 310 includes a single-phase inverter in which an antiparallel unit of a semiconductor switching element and a diode is single-phase-bridge-connected.

In FIG. 16B which shows configuration of current control section 320, an adder 322 obtains a signal of a sum Iref+Ihref of output current command value Iref and harmonic suppression current command value Ihref.

A current command adder 323 receives input of inverter current Iinv, and obtains a signal of deviation between inverter current Iinv and the sum signal Iref+Ihref of adder 322.

A proportional controller (alternatively, proportional-integral controller) 324 receives input of the deviation signal of current command adder 323.

A voltage command adder 325 obtains a single-phase voltage command value by adding the output signal of proportional controller 324 to a reference voltage described below.

A PWM gate signal generator 30 is provided on the output side of current control section 320, and compares the single-phase voltage command value with a carrier signal, and generates a gate signal by PWM modulation.

A PLL (phase locked loop) controller 31 receives input of interconnection point voltage Vs measured by transformer PT, and outputs the phase.

A sine wave oscillator 327s obtains a sine wave (reference voltage) in phase with Vs based on the output phase of PLL controller 31. The sine wave obtained by sine wave oscillator 327s is inputted into voltage command adder 325 as a reference voltage.

FIG. 16C which shows configuration of harmonic suppression control section 340, a multiplier 341n multiplies by n the phase signal outputted from PLL controller 31, where n is the order of the harmonic to be suppressed.

A sine wave oscillator 350s and a cosine wave oscillator 350c output a sine wave and a cosine wave respectively from the n-th order harmonic phase signal obtained by multiplier 341n.

An adder 81 sums the filter output current Iout and load current Iload, and inputs the sum into harmonic suppression control section 340.

A multiplier 341d multiplies Iout+Iload by the sine wave of sine wave oscillator 350s. A multiplier 341q multiplies Iout+Iload by the cosine wave of cosine wave oscillator 350c.

A doubler 341bd doubles the output of multiplier 341d, and a doubler 341bq doubles the output of multiplier 341q.

An LPF 342d extracts a direct current signal from a gain output of doubler 341bd, and output a harmonic sensing signal Idout in phase with the n-th order harmonic phase signal.

A LPF 342q extracts a direct current signal from a gain output of doubler 341bq, and outputs a harmonic sensing signal Iqout advanced by 90 degrees in phase from the n-th order harmonic phase signal.

Disturbance observer 43 is the same as disturbance observer 43 of FIG. 1C, FIG. 4B, receiving input of filter output signals Idout, Iqout (harmonic sensing signals), and estimating the disturbance of the harmonic, and outputting harmonic suppression signals Idn, Iqn.

A multiplier 344d multiplies the harmonic suppression signal Idn by the sine wave of sine wave oscillator 350s for converting the harmonic suppression signal Idn from direct current to alternating current. A multiplier 344q multiplies the harmonic suppression signal Iqn by the cosine wave of cosine wave oscillator 350c for converting the harmonic suppression signal Iqn from direct current to alternating current.

An adder 351 sums the output of multiplier 344d and the output of multiplier 344q, to obtain harmonic suppression current command value Ihref.

The following describes operation of the device configured as described above. In the current control section shown in FIG. 16B, inverter current Iinv is sensed by current sensor CT1 of FIG. 16A, and compared with a current command signal at current command adder 323.

This current command value is generated by summing at adder 322 the harmonic suppression current command value Ihref described below and the output current command value Iref depending on the object of the device.

For example, current command value Ihref is set for a control of holding constant the voltage of a direct current capacitor, or a reactive power compensation of supplying a reactive power to a system. It is conceivable that the direct current capacitor is replaced by a battery so that active power is supplied to the system.

The inverter current Iinv is compared with the current command value outputted from adder 322, to obtain a deviation, and apply the deviation with proportional controller 324, thus calculating the output voltage command value.

The output command value outputted by proportional controller 324 is added at adder 325 to the reference sine wave (reference voltage) in phase with the interconnection point voltage of the AC filter which is obtained by sine wave oscillator 327s, thus obtaining the single-phase voltage command value Vref.

Finally, the single-phase voltage command value Vref outputted by voltage command adder 325 is PWM-modulated by PWM gate signal generator 30, to generate a gate signal Gate, and thereby drive the inverter.

In harmonic suppression control section 340 shown in FIG. 16C, first, adder 81 obtains the sum of load current Iload and filter output current Iout that is sensed by current sensor CT2 and is a target whose harmonic current is to be suppressed. Next, when the harmonic current of the suppression target is of the order n, the phase that is determined by PLL controller 31 is multiplied in frequency by n by multiplier 341n, and a sine wave and a cosine wave which have the same frequency as the harmonic are obtained by sine wave oscillator 350s and cosine wave oscillator 350c. For transforming the n-th order harmonic current to direct current signal, the following Fourier series expansion equations (17), (18) are used.

$$I_{dout} = \frac{2}{T}\int_0^T (I_{load} + I_{out})\sin n\omega t\, dt \quad (17)$$

$$I_{qout} = \frac{2}{T}\int_0^T (I_{load} + I_{out})\cos n\omega t\, dt \quad (18)$$

Equations (17), (18) calculate averages for a period from time instant 0 to T by using integral calculation. In FIG. 16C, extraction of direct current component is implemented by only LPFs 324d, 342q instead of integral calculation, but may be combined with the average processing as in equations (17), (18). In such a case, it is necessary to add average processing to LPFs 47d, 47q in disturbance observer 43, to conform a delay of sensing.

The obtained direct current signal of harmonic current (harmonic sensing signal Idout, Iqout) is inputted into disturbance observer 43, to obtain harmonic suppression signals Idn, Iqn. Since harmonic suppression signals Idn, Iqn are direct current signals, harmonic suppression signals Idn, Iqn are multiplied by a sine wave and cosine wave at multiplier 344d, 344q, and added to each other at adder 351, to obtain harmonic suppression current command value Ihref.

Disturbance observer 43 operates as in the first embodiment (FIG. 1C).

Figure 17:
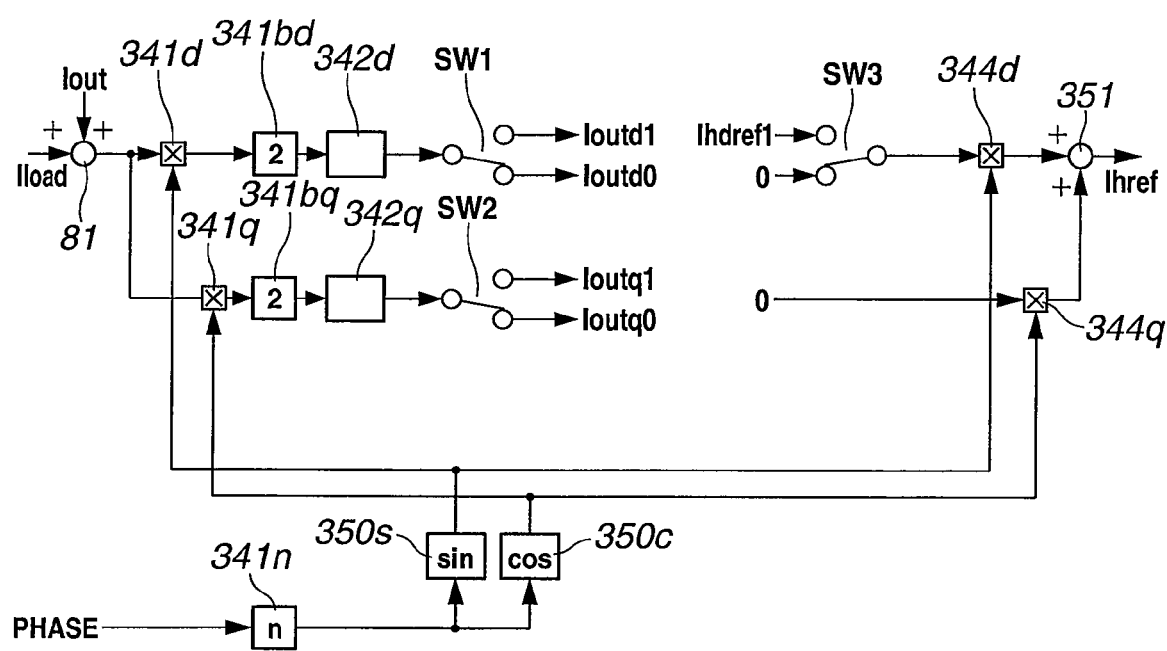
FIG. 17 is a configuration diagram of an open loop of the harmonic suppression control section during coefficient measurement according to the eighth embodiment of the present invention.

For enabling the control of the present invention, it is necessary to calculate coefficients Qam, Qbm proactively. The measurement of coefficients Qam, Qbm may be implemented by determining from the ratio in power spectrum density between input and output under condition that Gaussian noise signal is inputted, as in the first embodiment, or by determining with modifying the harmonic suppression control section 340 into an open loop as shown in FIG. 17. FIG. 17 shows an open loop configuration of harmonic suppression control section 340 when coefficients Qam, Qbm are measured.

Specifically, in FIG. 17, first, the d-axis and q-axis current command values of the n-th order harmonic are set to zero (the d-axis and q-axis current command values (harmonic suppression signals) which are inputted into multipliers 344d, 344q are set to zero by turning the switch SW3 to the lower side) wherein the d-axis is defined as a real part and q-axis is defined as an imaginary part, and the power conversion device 310 is operated. At that time, the d-axis and q-axis n-th order harmonic measured values of filter output currents Iout are represented by Ioutd0, Ioutq0. After measurement of Ioutd0, Ioutq0, all of switches SW1-SW3 in FIG. 17 are turned to the upper side, so that the d-axis current command value is shifted to Ihdref1, and d-axis and q-axis nth-order harmonic Ioutd1, Ioutq1 of filter output current Iout is measured.

Also in the case of single phase, the accuracy of coefficients Qam, Qbm does not need to be high. Accordingly, stable operation is possible even when some system variation occurs.

n is an integer, and is set as n=3, 5, 7, 9, . . . , because only harmonics of odd numbered orders occur in a typical single-phase alternating current circuit. In the configuration of the eighth embodiment, each block of harmonic suppression control serves to suppress a specific single order harmonic. In cases where there are a plurality of harmonics to be suppressed, suppression may be implemented by arranging in parallel a plurality of blocks of harmonic suppression control as in the second embodiment. Harmonics of many orders can be suppressed if the calculating ability of CPU or the like of the control circuit is sufficient.

As in the first embodiment, the input of harmonic suppression control section 340 may be modified to only filter output current Iout, for suppressing the harmonic current flowing out from the device.

It may be combined with the third embodiment so that tables of coefficients Qam, Qbm are prepared for responding to load variation, and coefficients Qam, Qbm are adjusted depending on the amplitude of load current Iload.

It may be combined with the fifth embodiment so that the input of harmonic suppression control section 340 is changed to system current Is, and the number of required current sensors CT is reduced while maintaining the active filter effect.

As described above, according to the eighth embodiment, it is possible to provide a stable active filtering function also for a single-phase inverter. Moreover, it is possible to obtain effects such as an effect of suppressing the harmonic current flowing out from the device, an effect of actively filtering a plurality of orders of harmonics, and an effect of reducing the number of required CTs.

Embodiment 9

In a ninth embodiment, the harmonic suppression control section 340 in the active filter of the single-phase inverter of the eighth embodiment is provided with the function of correcting the coefficient (Qdam, Qqam, Qdbm, Qqbm) that is an inverse function of a transfer function from harmonic suppression current command value to output current measured value as described in the seventh embodiment.

Figure 18:
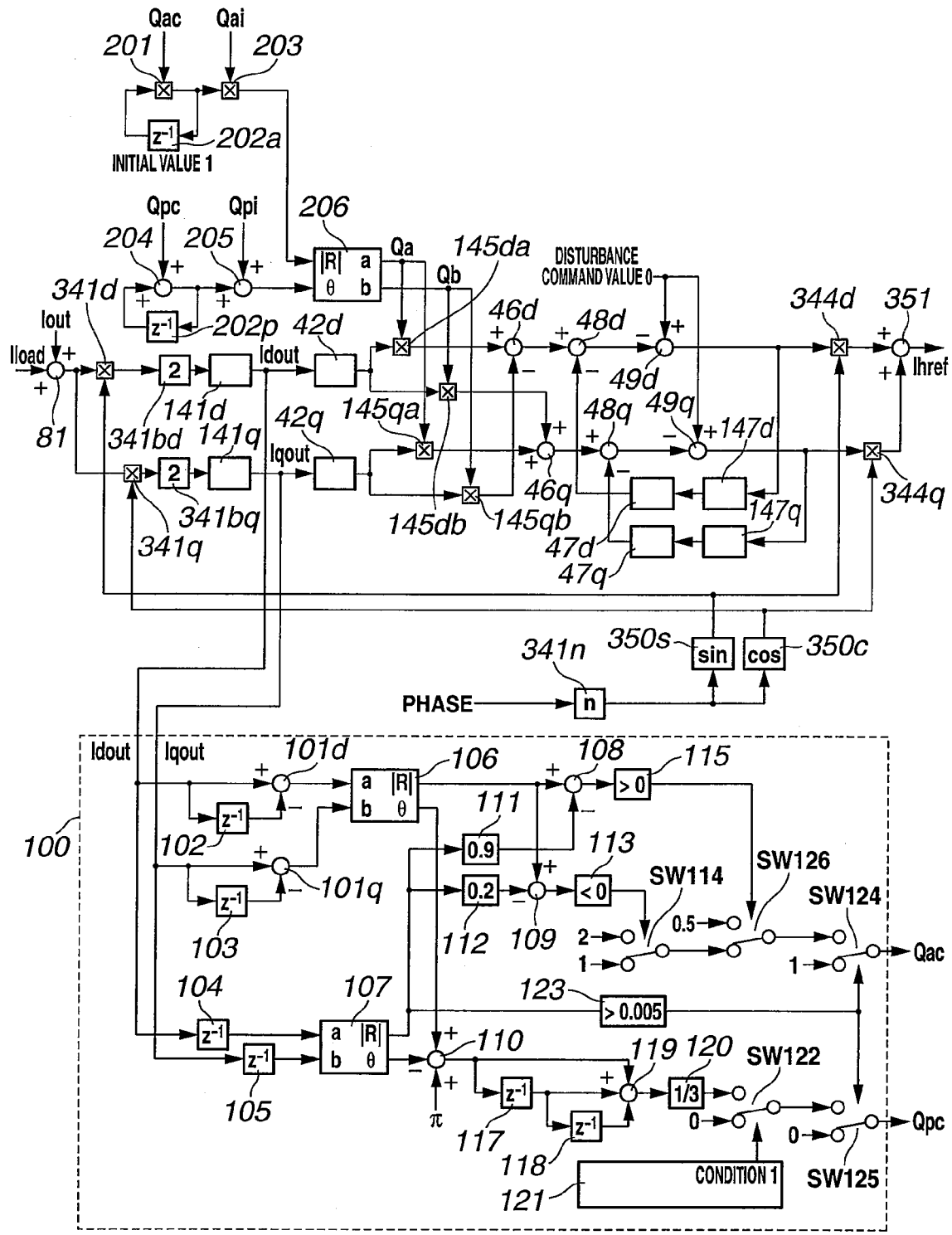
FIG. 18 is a configuration diagram of a harmonic suppression control section of a power conversion device according to a ninth embodiment of the present invention.

FIG. 18 shows configuration of the ninth embodiment, where the main circuit and current control section are the same as in FIGS. 1A, 1B, and omitted from the drawings. Common parts are given the same reference signs between FIG. 18 and FIG. 7 that shows the seventh embodiment in which the coefficient correction function is applied to the three-phase power conversion device.

In the ninth embodiment, coefficient Qdam, Qqam, Qam set by disturbance observer 43 of harmonic suppression control section 340 is handled as Qa, and coefficient Qdbm, Qqbm, Qbm set by disturbance observer 43 of harmonic suppression control section 340 is handled as Qb.

For ease of understanding about correction operation, it is modified so that coefficients Qa, Qb are inputted after polar coordinate transformation.

FIG. 18 differs from FIG. 7 as follows. In contrast to FIG. 7 in which Iout is dq-transformed at multiplier 41n and dq transformation part 41, the n-th order harmonic of the sum of filter output current Iout and load current Iload is converted into a direct current signal by multipliers 341d, 341q, doublers 341bd, 341bq, multiplier 341n, sine wave oscillator 350s, and cosine wave oscillator 350c as shown in FIG. 18. On the output side of the harmonic suppression control section, in contrast to FIG. 7 in which dq transformation and inverse dq transformation are performed at multiplier 44n, dq transformation part 44, and dq transformation part 51, the harmonic suppression current command value Ihref is calculated by multiplier 341n, sine wave oscillator 350s, cosine wave oscillator 350c, multipliers 344d, 344q, and adder 351 as shown in FIG. 18. In contrast to FIG. 7 in which the input to coefficient correction amount calculation section 100 is d-axis and q-axis current harmonic measured values Ihd, Ihq, the input is harmonic sensing signal Idout in phase with the n-th order harmonic phase signal (outputted by average processing part 141d), and harmonic sensing signal Iqout advanced by 90 degrees in phase from the n-th order harmonic phase signal (outputted by average processing part 141q) as shown in FIG. 18.

The other configuration of the harmonic suppression control section and coefficient correction amount calculation section 100 is the same as in FIG. 7.

The configuration of FIG. 18 operates as the configuration of FIG. 7, correcting the coefficients.

Although the circuit of FIG. 18 suppresses only one harmonic, also in cases where a plurality of harmonic suppression control sections are provided as in the second embodiment, each harmonic suppression control section may be further provided with a correction function. The input of the harmonic suppression control section may be set to Iout only, for suppressing the harmonic current flowing out from the device, as in the first embodiment.

As described above, according to the ninth embodiment, it is possible to automatically correct the coefficients Qa, Qb and perform a stable harmonic suppression control also for a single-phase inverter.

DESCRIPTION OF REFERENCE SIGNS 10, 310 . . . Power Conversion Device
11 . . . LCL Filter
12 . . . System Bus Bar
13 . . . Alternating Current Power Supply
14 . . . Load
20, 320 . . . Current Control Section
21, 41, 51, 71 . . . dq Transformation Part
22d, 22q, 25, 48d, 48q, 49d, 49q, 61, 73, 81, 10d, 101q, 108-110, 119, 204, 205, 322, 325, 351 . . . Adder
23d . . . d-Axis Current Command Adder
23q . . . q-Axis Current Command Adder
24d . . . d-Axis Proportional-Integral Controller
24q . . . q-Axis Proportional-Integral Controller
26, 44 . . . Inverse dq Transformation Part
30 . . . PWM Gate Signal Generator
31 . . . PLL Controller
40 . . . Harmonic Suppression Control Section
41n, 44n, 45dam, 45dbm, 45qam, 45qbm, 145da, 145db, 145qa, 145qb, 341d, 341q, 341n, 344d, 344q . . . Multiplier
42d, 42q, 47d, 47q, 342d, 342q . . . LPF
43 . . . Disturbance Observer
46d . . . d-Axis Harmonic Suppression Current Command Adder
46q . . . q-Axis Harmonic Suppression Current Command Adder 46q
100 . . . Coefficient Correction Amount Calculation Section
106, 107, 206 . . . Polar Coordinate Transformation Part
113, 115, 121, 123 . . . Evaluator
120 . . . Average Processing Part
201, 203 . . . Multiplier
313 . . . Single-Phase Power Supply
323 . . . Current Command Adder
324 . . . Proportional Controller
341bd, 341bq . . . Doubler
350s, 377s . . . Sine Wave Oscillator
350c . . . Cosine Wave Oscillator

The invention claimed is:

1. A harmonic current suppression device for a power conversion device, wherein an AC filter has one end connected to a system bus bar of an alternating current power supply and another end connected to the power conversion device, the harmonic current suppression device comprising:
a current control means that acquires a deviation between a current flowing through the power conversion device and a current command value of power conversion device current, and controls the power conversion device based on an output of the deviation; and
a harmonic suppression control means including:
a harmonic sensing part that receives input of an output current of the AC filter, and outputs a predetermined order harmonic of the input current in a direct current value form; and
a disturbance observer that estimates a disturbance of the harmonic by applying an output signal of the harmonic sensing part with a multiplier employing a coefficient, wherein the coefficient is defined as an inverse function of a transfer function from harmonic suppression current command value to current value inputted to the harmonic sensing part, wherein the coefficient is determined with measurement of a transfer characteristic of a control system;
wherein the harmonic suppression control means calculates a harmonic suppression current command value by acquiring a deviation between the estimated disturbance and a disturbance command value for disturbance suppression;
wherein the harmonic suppression current command value calculated by the harmonic suppression control means is superimposed on a current command value of the current control means, for harmonic current suppression.

2. The harmonic current suppression device as claimed in claim 1, wherein:
the harmonic current suppression device is provided with a plurality of the harmonic suppression control means in parallel, wherein the plurality of harmonic suppression control means correspond to a plurality of orders of harmonics;
the harmonic suppression current command values calculated by the harmonic suppression control means are summed;
the sum of the current command values is superimposed on the current command value of the current control means.

3. The harmonic current suppression device as claimed in claim 1, wherein:
the harmonic sensing part receives input of a summed current of the output current of the AC filter and a load current flowing through a load connected to the system bus bar, instead of input of the output current of the AC filter, and outputs a predetermined order harmonic of the input current in a direct current value form; and the coefficient of the disturbance observer is defined as an inverse function of a transfer function from the harmonic suppression current command value to the summed current.

4. The harmonic current suppression device as claimed in claim 1, wherein:

the harmonic sensing part receives input of a system current flowing through the system bus bar, instead of input of the output current of the AC filter, and outputs a predetermined order harmonic of the input current in a direct current value form; and the coefficient of the disturbance observer is defined as an inverse function of a transfer function from the harmonic suppression current command value to the system current.

5. The harmonic current suppression device as claimed in claim 1, wherein the harmonic sensed by the harmonic sensing part in the direct current value form has an order n wherein n=−1 so that the harmonic suppression current command value calculated by the harmonic suppression control means is an opposite phase component of a fundamental.

6. The harmonic current suppression device as claimed in claim 1, wherein:

the coefficient of the disturbance observer is determined with or without measurement of the transfer characteristic of the control system;

the harmonic current suppression device includes:

a coefficient correction amount calculation section that:

evaluates an amount of change between a harmonic measured value of an output signal of the harmonic sensing part and a harmonic measured value one cycle before the output signal;

calculates as a phase correction amount of the coefficient a difference in phase between the harmonic measured value one cycle before the output signal and the amount of change; and calculates as an amplitude correction amount of the coefficient a difference in amplitude between the harmonic measured value one cycle before the output signal and the amount of change; and a coefficient correction means that corrects the phase of the coefficient by the phase correction amount calculated by the coefficient correction amount calculation section, and corrects the amplitude of the coefficient by the amplitude correction amount calculated by the coefficient correction amount calculation section.

7. The harmonic current suppression device as claimed in claim 6, wherein the coefficient correction means presets a condition for correction, and adjusts the calculated phase correction amount and amplitude correction amount, depending on whether or not the sensed harmonic conforms to the condition for correction.

8. The harmonic current suppression device as claimed in claim 1, wherein:

the current control means acquires a deviation between a d-axis component of the current flowing through the power conversion device and a current command value of d-axis component of power conversion device current and a deviation between a q-axis component of the current flowing through the power conversion device and a current command value of q-axis component of power conversion device current, and controls the power conversion device based on an output of the deviations; and the harmonic sensing part of the harmonic suppression control means includes:

a discrete Fourier transformation part that applies d, q-axis transformation to the input current, and outputs a predetermined order harmonic of the input current in a direct current value form; and a disturbance observer that estimates a disturbance of a d-axis component of the harmonic and a disturbance of a q-axis component of the harmonic by applying an output signal of the discrete Fourier transformation part with a multiplier employing a coefficient, wherein the coefficient is defined as an inverse function of a transfer function from harmonic suppression current command value of each of d-axis and q-axis components to current value inputted to the harmonic sensing part, wherein the coefficient is determined with measurement of the transfer characteristic of the control system;

wherein d-axis and q-axis harmonic suppression current command values are calculated by acquiring a deviation between the estimated disturbance and a disturbance command value for disturbance suppression;

wherein the d-axis and q-axis harmonic suppression current command values calculated by the harmonic suppression control means is superimposed on d-axis and q-axis current command values of the current control means, for harmonic current suppression.

9. The harmonic current suppression device as claimed in claim 8, wherein:

the disturbance observer estimates the disturbances by calculating (Ioutd·Qam−Ioutq·Qbm)+j(Ioutq·Qam+Ioutd·Qbm) by applying a multiplier to a n-th order harmonic measured value of a d-axis output signal of the discrete Fourier transformation section represented by Ioutd and a n-th order harmonic measured value of a q-axis output signal of the discrete Fourier transformation section represented by Ioutq, wherein the multiplier employs the coefficient, wherein n is an integer other than zero, wherein the coefficient is defined as an inverse characteristic Qam+j·Qbm of a transfer characteristic Pam+j·Pbm from current command value to AC filter output current measured value;

the transfer characteristic of the control system is expressed in a complex number form wherein the d-axis component of the output current of the discrete Fourier transformation section is defined as a real part, and the q-axis component of the output current of the discrete Fourier transformation section is defined as an imaginary part; and Pam represents an output current of the discrete Fourier transformation section that is in phase with harmonic suppression current command values of d-axis and q-axis components, and Pbm represents an output current of the discrete Fourier transformation section that is advanced by 90 degrees in phase from the harmonic suppression current command values of d-axis and q-axis components.

10. The harmonic current suppression device as claimed in claim 1, wherein:

the current control means obtains a single-phase voltage command value by addition of a reference sine wave to the output of deviation between the current flowing through the power conversion device and the current command value, and controls the power conversion device based on the single-phase voltage command value, wherein the reference sine wave is in phase with a voltage of an interconnection point between the system bus bar and the AC filter;

the harmonic sensing part of the harmonic suppression control means obtains a first product of the input current and a sine wave signal that is identical in frequency to a harmonic for which suppression is targeted and identical in phase to n times the phase of the voltage of the interconnection point between system bus bar and the AC filter, wherein n represents the order of the harmonic for which suppression is targeted, and extracts a direct current component of the first product, and obtains a harmonic measured signal in phase with the n-th order harmonic;

the harmonic sensing part of the harmonic suppression control means obtains a second product of the input current and a cosine wave signal that is identical in frequency to the harmonic for which suppression is targeted and identical in phase to n times the phase of the voltage of the interconnection point between system bus bar and the AC filter, wherein n represents the order of the harmonic for which suppression is targeted, and extracts a direct current component of the second product, and obtains a harmonic measured signal advanced by 90 degrees in phase from the n-th order harmonic; and the disturbance observer of the harmonic suppression control means estimates the disturbance of the harmonic by applying the output signal of the harmonic sensing part with a multiplier employing a coefficient, wherein the coefficient is defined as an inverse function of a transfer function from a harmonic suppression current command value of a component in phase to the n-th order harmonic and a harmonic suppression current command value of a component advanced by 90 degrees in phase from the n-th order harmonic to a current value inputted to the harmonic sensing part, wherein the coefficient is determined with measurement of the transfer characteristic of the control system.

11. A harmonic current suppression method for a power conversion device, wherein an AC filter has one end connected to a system bus bar of an alternating current power supply and another end connected to the power conversion device, the harmonic current suppression method comprising:

a harmonic sensing step of causing a harmonic sensing part of a harmonic suppression control means to receive input of an output current of the AC filter, and output a predetermined order harmonic of the input current in a direct current value form;

a disturbance estimation step of causing a disturbance observer of the harmonic suppression control means to estimate a disturbance of the harmonic by applying an output signal of the harmonic sensing part with a multiplier employing a coefficient, wherein the coefficient is defined as an inverse function of a transfer function from harmonic suppression current command value to current value inputted to the harmonic sensing part, wherein the coefficient is determined with measurement of a transfer characteristic of a control system;

a harmonic suppression current command value calculation step of causing the harmonic suppression control means to calculate a harmonic suppression current command value by acquiring a deviation between the estimated disturbance and a disturbance command value for disturbance suppression; and a step of causing a current control means to acquire a deviation between a current flowing through the power conversion device and a current command value, and control the power conversion device based on an output of the deviation, wherein the current command value is produced by superimposing the harmonic suppression current command value calculated by the harmonic suppression control means on a set current command value.

12. The harmonic current suppression method as claimed in claim 11, wherein:

the harmonic current suppression method is provided with a plurality of the harmonic suppression control means in parallel, wherein the plurality of harmonic suppression control means correspond to a plurality of orders of harmonics; and the harmonic current suppression method comprises a step of causing the current control means to sum the harmonic suppression current command values calculated by the harmonic suppression control means, and superimpose the sum of the current command values on the current command value of the current control means.

13. The harmonic current suppression method as claimed in claim 11, wherein:

the harmonic sensing step is a step of receiving input of a summed current of the output current of the AC filter and a load current flowing through a load connected to the system bus bar, instead of input of the output current of the AC filter, and outputting a predetermined order harmonic of the input current in a direct current value form; and the coefficient of the disturbance observer is defined as an inverse function of a transfer function from the harmonic suppression current command value to the summed current.

14. The harmonic current suppression method as claimed in claim 11, wherein:

the harmonic sensing step is a step of receiving input of a system current flowing through the system bus bar, instead of input of the output current of the AC filter, and outputs a predetermined order harmonic of the input current in a direct current value form; and the coefficient of the disturbance observer is defined as an inverse function of a transfer function from the harmonic suppression current command value to the system current.

15. The harmonic current suppression method as claimed in claim 11, wherein the harmonic sensed by the harmonic sensing step in the direct current value form has an order n wherein n=−1 so that the harmonic suppression current command value calculated by the harmonic suppression control means is an opposite phase component of a fundamental.

16. The harmonic current suppression method as claimed in claim 11, wherein:

the coefficient of the disturbance observer is determined with or without measurement of the transfer characteristic of the control system;

the harmonic current suppression method includes:
a coefficient correction amount calculation step of causing a coefficient correction amount calculation section of a coefficient correction means to:
evaluate an amount of change between a harmonic measured value of an output signal of the harmonic sensing part and a harmonic measured value one cycle before the output signal;
calculate as a phase correction amount of the coefficient a difference in phase between the harmonic measured value one cycle before the output signal and the amount of change; and calculate as an amplitude correction amount of the coefficient a difference in amplitude between the harmonic measured value one cycle before the output signal and the amount of change; and a coefficient correction step of causing the coefficient correction means to correct the phase of the coefficient by the phase correction amount calculated by the coefficient correction amount calculation section, and correct the amplitude of the coefficient by the amplitude correction amount calculated by the coefficient correction amount calculation section.

17. The harmonic current suppression method as claimed in claim 16, wherein the coefficient correction step presets a condition for correction, and adjusts the calculated phase correction amount and amplitude correction amount, depending on whether or not the sensed harmonic conforms to the condition for correction.

18. The harmonic current suppression method as claimed in claim 11, wherein:

the harmonic sensing step is a step of causing a discrete Fourier transformation part to apply d, q-axis transformation to the input current, and output a predetermined order harmonic of the input current in a direct current value form;

the disturbance estimation step is a step of estimating a disturbance of a d-axis component of the harmonic and a disturbance of a q-axis component of the harmonic by applying an output signal of the discrete Fourier transformation part with a multiplier employing a coefficient, wherein the coefficient is defined as an inverse function of a transfer function from harmonic suppression current command value of each of d-axis and q-axis components to current value inputted to the harmonic sensing part, wherein the coefficient is determined with measurement of the transfer characteristic of the control system;

the harmonic suppression current command value calculation step is a step of calculating d-axis and q-axis harmonic suppression current command values by acquiring a deviation between the estimated disturbance and a disturbance command value for disturbance suppression; and the step of controlling the power conversion device is a step of acquiring a deviation between a d-axis component of the current flowing through the power conversion device and a current command value obtained by superimposing the d-axis harmonic suppression current command value calculated by the harmonic suppression control means on a d-axis current command value of the current control means, and acquiring a deviation between a q-axis component of the current flowing through the power conversion device and a current command value obtained by superimposing the q-axis harmonic suppression current command value calculated by the harmonic suppression control means on a q-axis current command value of the current control means, and controlling the power conversion device based on an output of the deviations.

19. The harmonic current suppression method as claimed in claim 18, wherein:

the disturbance estimation step is a step of estimating the disturbances by calculating $(Ioutd \cdot Qam - Ioutq \cdot Qbm) + j(Ioutq \cdot Qam + Ioutd \cdot Qbm)$ by applying a multiplier to a n-th order harmonic measured value of a d-axis output signal of the discrete Fourier transformation section represented by Ioutd and a n-th order harmonic measured value of a q-axis output signal of the discrete Fourier transformation section represented by Ioutq, wherein the multiplier employs the coefficient, wherein n is an integer other than zero, wherein the coefficient is defined as an inverse characteristic $Qam + j \cdot Qbm$ of a transfer characteristic $Pam + j \cdot Pbm$ from current command value to AC filter output current measured value;

the transfer characteristic of the control system is expressed in a complex number form wherein the d-axis component of the output current of the discrete Fourier transformation section is defined as a real part, and the q-axis component of the output current of the discrete Fourier transformation section is defined as an imaginary part; and Pam represents an output current of the discrete Fourier transformation section that is in phase with harmonic suppression current command values of d-axis and q-axis components, and Pbm represents an output current of the discrete Fourier transformation section that is advanced by 90 degrees in phase from the harmonic suppression current command values of d-axis and q-axis components.

20. The harmonic current suppression method as claimed in claim 11, wherein:

the step of controlling the power conversion device is a step of obtaining a single-phase voltage command value by addition of a reference sine wave to the output of deviation between the current flowing through the power conversion device and the current command value, and controlling the power conversion device based on the single-phase voltage command value, wherein the reference sine wave is in phase with a voltage of an interconnection point between the system bus bar and the AC filter;

the harmonic sensing step includes a step of obtaining a first product of the input current and a sine wave signal that is identical in frequency to a harmonic for which suppression is targeted and identical in phase to n times the phase of the voltage of the interconnection point between system bus bar and the AC filter, wherein n represents the order of the harmonic for which suppression is targeted, and extracting a direct current component of the first product, and obtaining a harmonic measured signal in phase with the n-th order harmonic; and a step of obtaining a second product of the input current and a cosine wave signal that is identical in frequency to the harmonic for which suppression is targeted and identical in phase to n times the phase of the voltage of the interconnection point between system bus bar and the AC filter, wherein n represents the order of the harmonic for which suppression is targeted, and extracting a direct current component of the second product, and obtaining a harmonic measured signal advanced by 90 degrees in phase from the n-th order harmonic; and the disturbance estimation step is a step of estimating the disturbance of the harmonic by applying the output signal of the harmonic sensing part with a multiplier employing a coefficient, wherein the coefficient is defined as an inverse function of a transfer function from a harmonic suppression current command value of a component in phase to the n-th order harmonic and a harmonic suppression current command value of a component advanced by 90 degrees in phase from the n-th order harmonic to a current value inputted to the harmonic sensing part, wherein the coefficient is determined with measurement of the transfer characteristic of the control system.

* * * * *